US010131159B2

(12) United States Patent
Inaba et al.

(10) Patent No.: US 10,131,159 B2
(45) Date of Patent: Nov. 20, 2018

(54) PRINTING DEVICE PROVIDED WITH ABUTTING PART FOR SUPPRESSING COVER FROM OPENING DUE TO IMPACT FROM FALL

(71) Applicant: BROTHER KOGYO KABUSHIKI KAISHA, Nagoya, Aichi (JP)

(72) Inventors: Takehiko Inaba, Aichi-ken (JP); Hidenori Jo, Nagoya (JP); Yuki Nagashima, Toyokawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/664,267

(22) Filed: Jul. 31, 2017

(65) Prior Publication Data

US 2018/0072079 A1 Mar. 15, 2018

(30) Foreign Application Priority Data

Sep. 9, 2016 (JP) .................................. 2016-176363

(51) Int. Cl.
| | |
|---|---|
| *B41J 29/02* | (2006.01) |
| *B41J 3/36* | (2006.01) |
| *B41J 29/13* | (2006.01) |
| *B41J 2/315* | (2006.01) |
| *F16B 21/09* | (2006.01) |

(52) U.S. Cl.
CPC .................. *B41J 3/36* (2013.01); *B41J 29/02* (2013.01); *B41J 29/13* (2013.01); *B41J 2/315* (2013.01); *F16B 21/09* (2013.01)

(58) Field of Classification Search
CPC ..... B41J 3/36; B41J 29/13; B41J 29/02; B41J 2/315; F16B 21/09
See application file for complete search history.

(56) References Cited

U.S. PATENT DOCUMENTS

2015/0246568 A1* 9/2015 Nagashima ............ B41J 15/042
347/104

FOREIGN PATENT DOCUMENTS

JP 2015-160427 A 9/2015

* cited by examiner

*Primary Examiner* — Yaovi M Ameh
(74) *Attorney, Agent, or Firm* — Scully, Scott, Murphy & Presser, PC

(57) ABSTRACT

A printing device includes: a printing mechanism; a housing having a casing and a cover; a first frame member; a second frame member; an engaging member; and an abutting part. The first frame member supports the printing mechanism. The second frame member supports the printing medium. The second frame member is juxtaposed with the first frame member in a first direction. The engaging member is supported to the first frame member. The engaging member is movable between a first position in engagement with the cover and a second position out of engagement with the cover. The abutting part is provided at at least one of the first frame member and the second frame member. The abutting part avoids direct contact between the engaging member in the first position and the second frame member when the second frame member is deformed and contacts the first frame member through the abutting part.

8 Claims, 25 Drawing Sheets

PRINTING DEVICE PROVIDED WITH ABUTTING PART FOR SUPPRESSING COVER FROM OPENING DUE TO IMPACT FROM FALL

CROSS REFERENCE TO RELATED APPLICATION

This application claims priority from Japanese Patent Application No. 2016-176363 filed Sep. 9, 2016. The entire content of the priority application is incorporated herein by reference.

TECHNICAL FIELD

The present disclosure relates to a printing device.

BACKGROUND

Various portable printing devices have been proposed. Japanese Patent Application Publication No. 2015-160427 describes one such printing device provided with a belt clip. By attaching the printing device to a waist belt with this belt clip, the user can use the printing device portably.

SUMMARY

With the conventional portable printing device, the user may inadvertently drop the device when attaching the device to or detaching the device from a belt. Depending on the height at which the printing device is dropped, the impact from the fall may cause a cover to open over an accommodating section that houses a printing media.

In view of the foregoing, it is an object of the disclosure to provide a printing device that suppresses a cover from opening due to impacts from falls and the like.

In order to attain the above and other objects, according to one aspect, the disclosure provides a printing device including: a printing mechanism; a housing; an accommodating section; a first frame member; a second frame member; an engaging member; and an abutting part. The printing mechanism is configured to print an image on a printing medium. The housing has a box-like shape. The housing includes: a casing having an opening; and a cover capable of opening and closing the opening. The accommodating section is provided in the casing and configured to accommodate the printing medium therein. The accommodating section is exposed to an outside through the opening. The first frame member is accommodated in the casing and supports the printing mechanism. The second frame member is accommodated in the casing and configured to support the printing medium. The second frame member is arranged juxtaposed with the first frame member in a first direction. The engaging member is supported to the first frame member. The engaging member is movable between a first position and a second position. The engaging member in the first position is in engagement with the cover to close the cover. The engaging member in the second position is out of engagement with the cover to open the cover. The abutting part is provided at at least one of the first frame member and the second frame member. The abutting part is configured to avoid direct contact between a part of the engaging member in the first position and the second frame member when the second frame member is deformed upon application of an external force and contacts the first frame member through the abutting part.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

<Printing Device 1>

Figure 1:
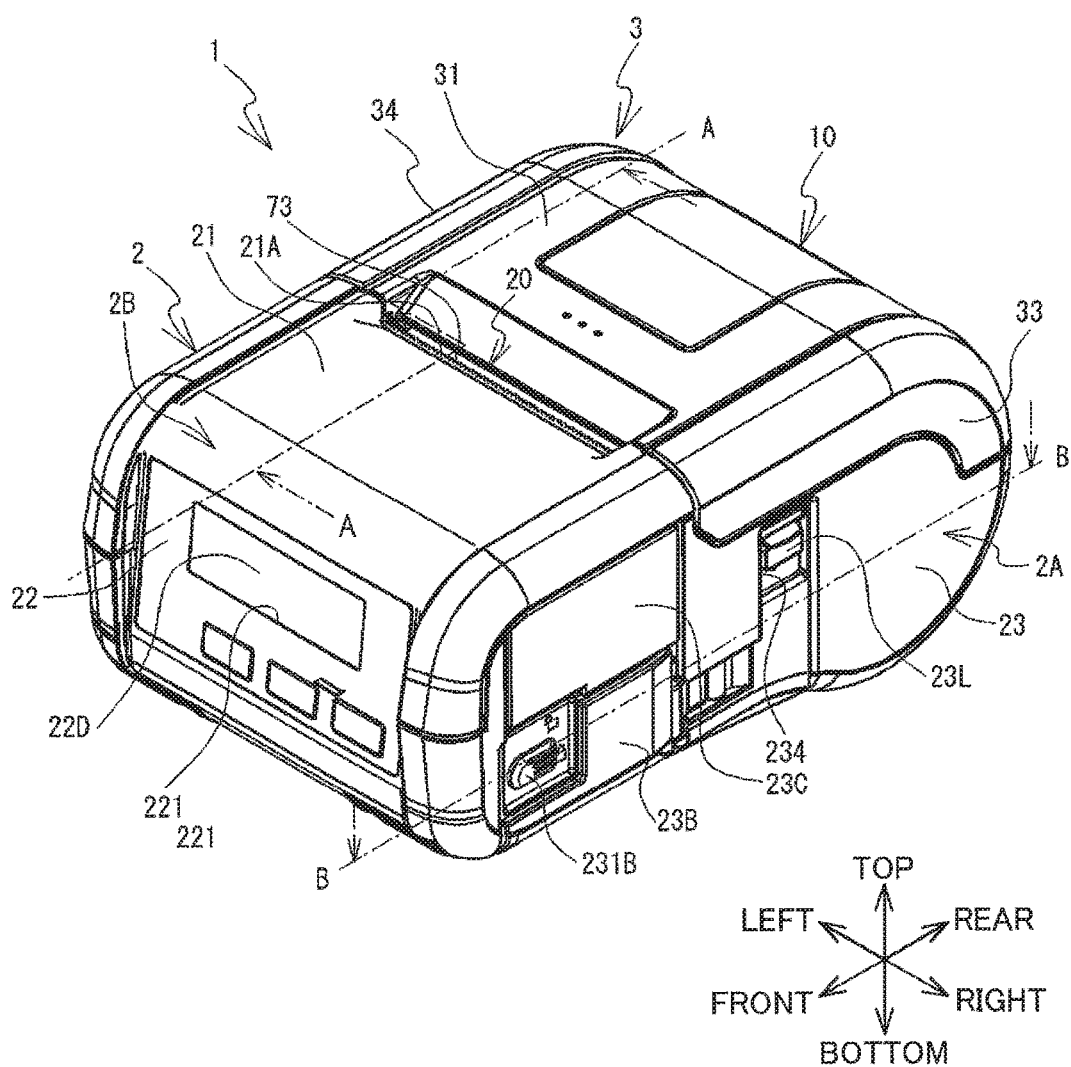
FIG. 1 is a perspective view of a printing device 1 according to one embodiment, in which the printing device 1 is in a closed state.

A printing device 1 according to one embodiment will be described with reference to the accompanying drawings, wherein like parts and components are designated by the same reference numerals to avoid duplicating description.

The printing device 1 is a thermal printing device that can print text, illustrations, and the like on a heat-sensitive printing medium (thermal paper). The printing device 1 can be battery-powered. The printing device 1 may be attached to the user's belt with a belt clip (not illustrated), for example, enabling the user to carry the printing device 1 around at a work site. The printing device 1 can be connected to an external device (not illustrated) using a USB (registered trademark) cable. The printing device 1 can print images, such as text, illustrations, and the like, on a printing medium based on print data received from the external device. The external device may be a common personal computer (PC), for example.

In the following description, a lower-right side of the printing device 1 in FIG. 1 is defined as a right side of the printing device 1. Similarly, an upper-left side, an upper-right side, a lower-left side, a top side, and a bottom side of the printing device 1 in FIG. 1 are respectively defined as a left side, a rear side, a front side, a top side, and a bottom side of the printing device 1.

Figure 2:
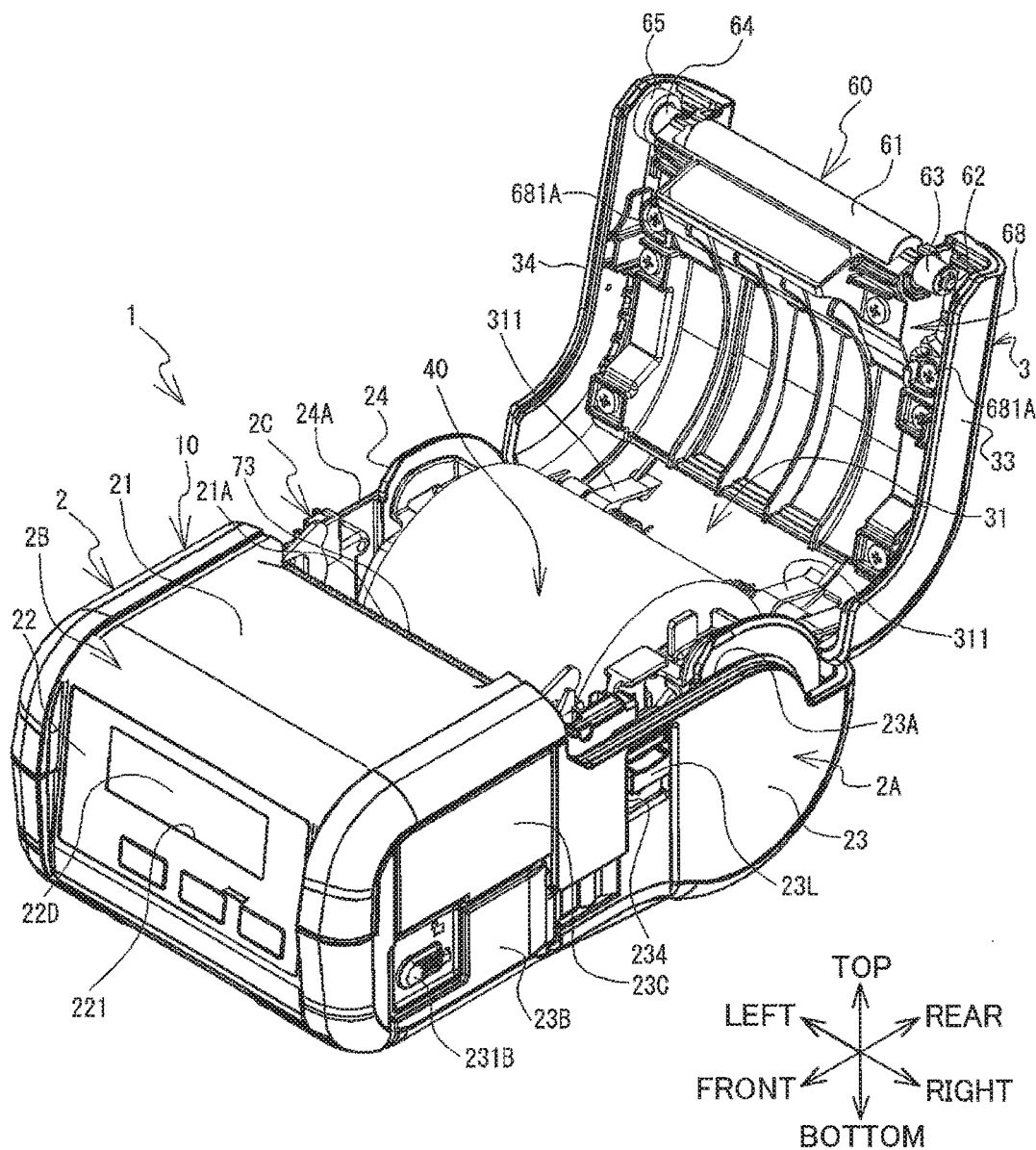
FIG. 2 is a perspective view of the printing device 1 according to the embodiment, in which the printing device 1 is in an open state.

As illustrated in FIGS. 1 and 2, the printing device 1 is provided with a housing 10. The housing 10 has a general box-like rectangular parallelepiped shape that is elongated in a front-rear direction. Within the housing 10 are provided a first accommodating section 20A (see FIG. 3), a second accommodating section 20B (see FIG. 3), and a third accommodating section 20C (see FIG. 5). A first frame member 7 (see FIG. 12) is accommodated throughout the first accommodating section 20A and the second accommodating section 20B. A control board 8 (see FIG. 21) is accommodated in the first accommodating section 20A. A second frame member 4 (see FIG. 23) is accommodated in the second accommodating section 20B. A battery 5 (see FIG. 7) is accommodated in the third accommodating section 20C. The housing 10 also has a first cover 2, and a second cover 3.

<First Cover 2>

Figure 3:
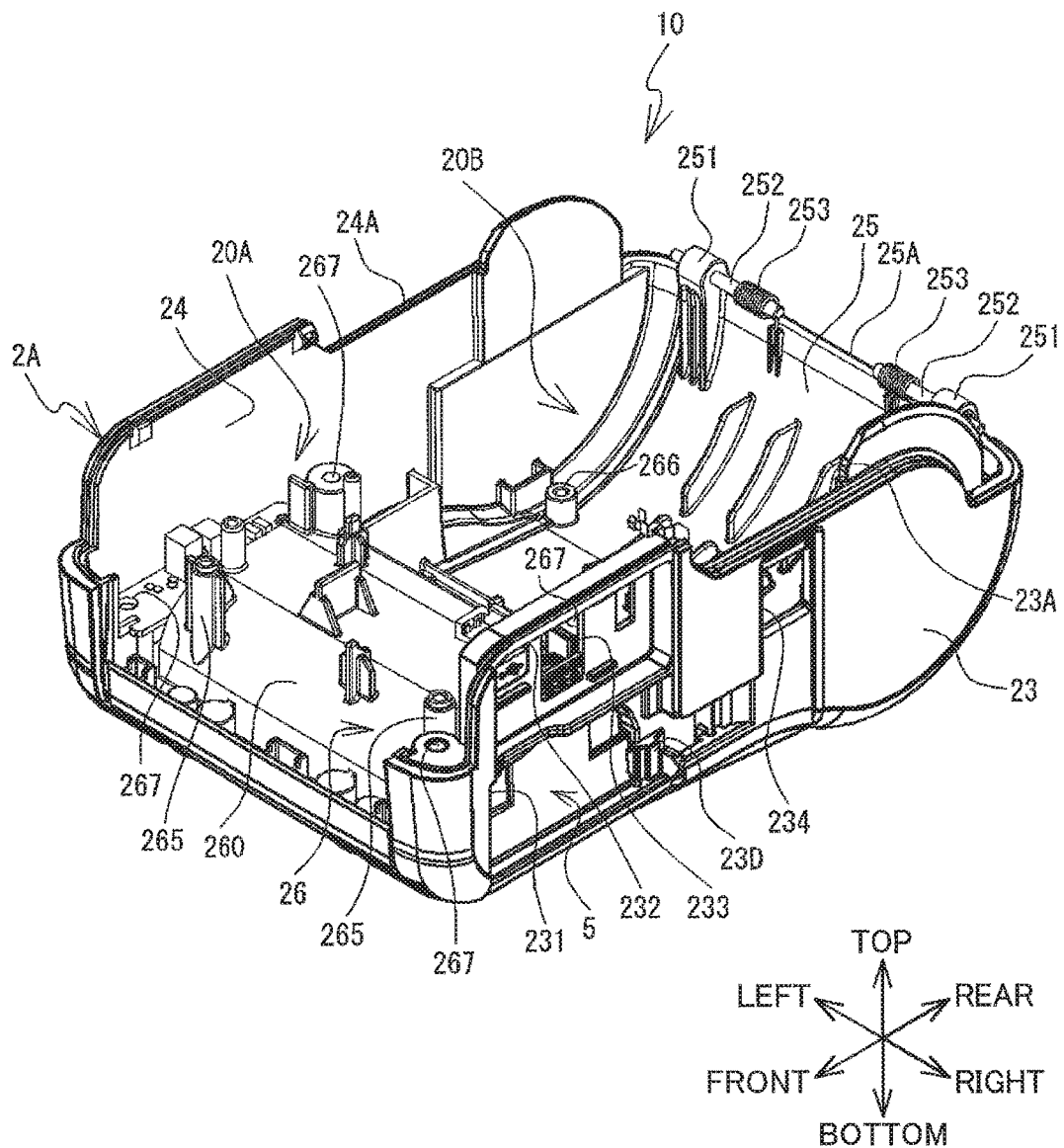
FIG. 3 is a perspective view of a first bottom cover 2A of the printing device 1 according to the embodiment.
Figure 4:
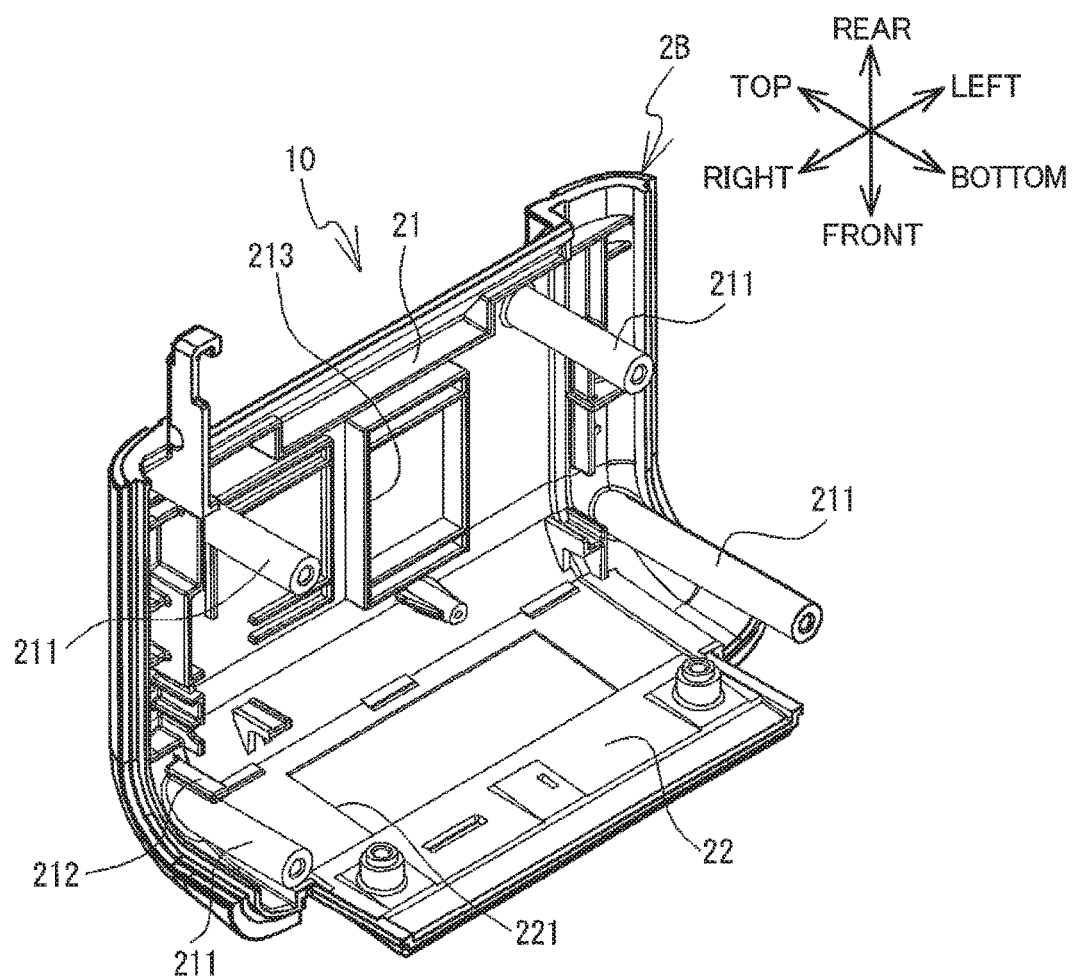
FIG. 4 is a perspective view of a first top cover 2B of the printing device 1 according to the embodiment.

As illustrated in FIGS. 1, 3, and 4, the first cover 2 constitutes wall portions on front, rear, right, left, and bottom sides of the housing 10 and on a front portion of a top side of the housing 10 from approximately a front-rear center thereof. Specifically, the first cover 2 includes a top wall portion 21, a front wall portion 22, a right wall portion 23, a left wall portion 24, a rear wall portion 25, and a bottom wall portion 26. The top wall portion 21 constitutes the front half portion of the wall portion on the top side of the housing 10. The front wall portion 22 constitutes the wall portion on the front side of the housing 10. The right wall portion 23 constitutes the wall portion on the right side of the housing 10. The left wall portion 24 constitutes the wall portion on the left side of the housing 10. The rear wall portion 25 constitutes the wall portion on the rear side of the housing 10. The bottom wall portion 26 constitutes the wall portion on the bottom side of the housing 10.

Space is formed inside the first cover 2. The first cover 2 has a first bottom cover 2A (see FIG. 3), and a first top cover 2B (see FIG. 4).

As illustrated in FIG. 3, the first bottom cover 2A includes the right wall portion 23, the left wall portion 24, the rear wall portion 25, and the bottom wall portion 26. Two extension parts 265 are provided on an inner surface (i.e. top surface) of the bottom wall portion 26 of the first bottom cover 2A. The extension parts 265 are columnar-shaped and protrude upward from the bottom wall portion 26. Threaded holes are formed in top ends of the extension parts 265. Two extension parts 266 are provided on the inner surface of the bottom wall portion 26 of the first bottom cover 2A. Threaded holes are formed in top ends of the extension parts 266. Circular through-holes 267 are formed in the inner surface of the bottom wall portion 26 of the first bottom cover 2A, with two through-holes 267 provided in left and right sides at a front end portion of the bottom wall portion 26 and two through-holes 267 provided in the left and right sides at an approximate front-rear center portion of the bottom wall portion 26.

As illustrated in FIG. 4, the first top cover 2B includes the top wall portion 21, and the front wall portion 22. Cylindrical shaped extension parts 211 are provided on an inner surface (i.e. bottom surface) of the top wall portion 21 at each of four corners thereof and protruding downward therefrom. Threaded holes are formed in bottom surfaces of the extension parts 211. A plate-shaped protruding part 212 is provided on the inner surface of the top wall portion 21 on a rear side relative to the extension part 211 provided in the front-right corner. The protruding part 212 protrudes downward from the inner surface of the top wall portion 21. A protruding part 213 is provided at an approximate center portion on the inner surface of the top wall portion 21 and protrudes downward therefrom. The protruding part 213 has a plurality of flat plates arranged as a rectangular frame.

As illustrated in FIGS. 1 and 2, the first top cover 2B engages with the first bottom cover 2A from above in a portion of the first bottom cover 2A from an approximate front-rear center to a front end thereof. Screws (not illustrated) are inserted from below into the four through-holes 267 (see FIG. 3) formed in the bottom wall portion 26 of the first bottom cover 2A. These screws are screwed into the threaded holes formed in the four extension parts 211 (see FIG. 4) of the first top cover 2B, thereby fixing the first top cover 2B to the first bottom cover 2A.

As illustrated in FIG. 3, the first accommodating section 20A constitutes the interior space of the first cover 2 in a region below the top wall portion 21 (see FIGS. 1 and 2). The first accommodating section 20A spans the interior space of the first cover 2 from an approximate front-rear center position to a front end of the interior space. The second accommodating section 20B constitutes the interior space of the first cover 2 on a rear side relative to the first accommodating section 20A. The second accommodating section 20B spans from the approximate front-rear center position to a rear end of the interior space.

As illustrated in FIG. 2, a rectangular-shaped open area 2C is formed in an area surrounded by a rear edge of the top wall portion 21 (hereinafter referred to as an "edge part 21A"), a portion of a top edge of the right wall portion 23 rearward relative to the top wall portion 21 (hereinafter referred to as an "edge part 23A"), a portion of a top edge of the left wall portion 24 rearward relative to the top wall portion 21 (hereinafter referred to as an "edge part 24A"), and a top edge of the rear wall portion 25 (hereinafter referred to as an "edge part 25A"; see FIG. 3). The open area 2C is formed in an upper portion of the first cover 2 extending from an approximate front-rear center to a rear end of the first cover 2. The open area 2C opens into the second accommodating section 20B (see FIG. 3).

As illustrated in FIG. 4, a through-hole 221 is formed in the front wall portion 22. The through-hole 221 has a rectangular shape that is elongated in a left-right direction. As illustrated in FIGS. 1 and 2, a display unit 22D is exposed to an outside of the front wall portion 22 through the through-hole 221. The display unit 22D can display characters to be printed on the printing medium, setting information, and the like.

As illustrated in FIG. 3, through-holes 231, 232, 233, and 234 are formed in the right wall portion 23. The through-hole 231 is formed in a lower portion of the right wall portion 23 near a front edge thereof. The through-hole 231 has a generally rectangular shape that is elongated in the front-rear direction. The through-hole 231 opens into the third accommodating section 20C (see FIG. 5) described later on a right side thereof. A locking mechanism 23D is provided on the right wall portion 23 near a rear edge of the through-hole 231. The locking mechanism 23D can move along an outer surface of the right wall portion 23 in the front-rear direction. When the locking mechanism 23D is moved forward, a front end portion of the locking mechanism 23D protrudes farther forward than the rear edge of the through-hole 231. When the locking mechanism 23D is moved rearward, the front end portion of the locking mechanism 23D is disposed farther rearward than the rear edge of the through-hole 231. The locking mechanism 23D is urged forward by a spring (not illustrated).

As illustrated in FIG. 1, a plate-shaped cover member 23B is pivotally movably supported on an outer surface of the right wall portion 23 at a position rearward relative to the through-hole 231 (see FIG. 3). By pivotally moving, the cover member 23B can move between a position covering the through-hole 231 (see FIG. 1) and a position uncovering the through-hole 231. The cover member 23B is provided with a locking mechanism 231B that restricts movement of the cover member 23B when the cover member 23B covers the through-hole 231.

As illustrated in FIG. 3, the through-hole 232 is formed above the through-hole 231. A USB socket mounted on the control board 8 (see FIG. 21) is disposed inside the through-hole 232. A USB connector of a USB cable connected to the external device is inserted into the through-hole 232 from an outside thereof, and is connected to the USB socket inside the through-hole 232. The through-hole 233 is formed at a position rearward relative to the through-hole 232. A power supply socket mounted on the control board 8 is disposed inside the through-hole 233. A plug connected to a power adapter (not illustrated) is inserted into the through-hole 233 from an outside thereof, and is connected to the power supply socket inside the through-hole 233.

As illustrated in FIG. 1, a plate-shaped cover member 23C can be fitted on the outer surface of the right wall portion 23 in a rectangular region that includes the through-hole 232 and the through-hole 233 (see FIG. 3). The cover member 23C covers the through-hole 232 and the through-hole 233 when fitted on the right wall portion 23.

As illustrated in FIG. 3, the through-hole 234 has a general rectangular shape that is elongated in an up-down direction. As illustrated in FIG. 1, a lever 23L protrudes from an inside of the right wall portion 23 to an outside thereof through the through-hole 234. The lever 23L is supported to the first frame member 7 (see FIG. 12) inside the through-hole 234. The lever 23L can move in the up-down direction within the through-hole 234. The lever 23L is a switch that releases and locks the second cover 3 described later.

As illustrated in FIG. 3, two support parts 251 are provided at the rear wall portion 25 and protrude higher than the edge part 25A. One of the support parts 251 protrudes upward from the edge part 25A near a right end thereof, while the other support part 251 protrudes upward from the edge part 25A near a left end thereof. Each support part 251 supports a shaft 252 that extends in the left-right direction. The shafts 252 extend inward in the left-right direction from the corresponding support parts 251. Springs 253 are mounted over the shafts 252.

Figure 5:
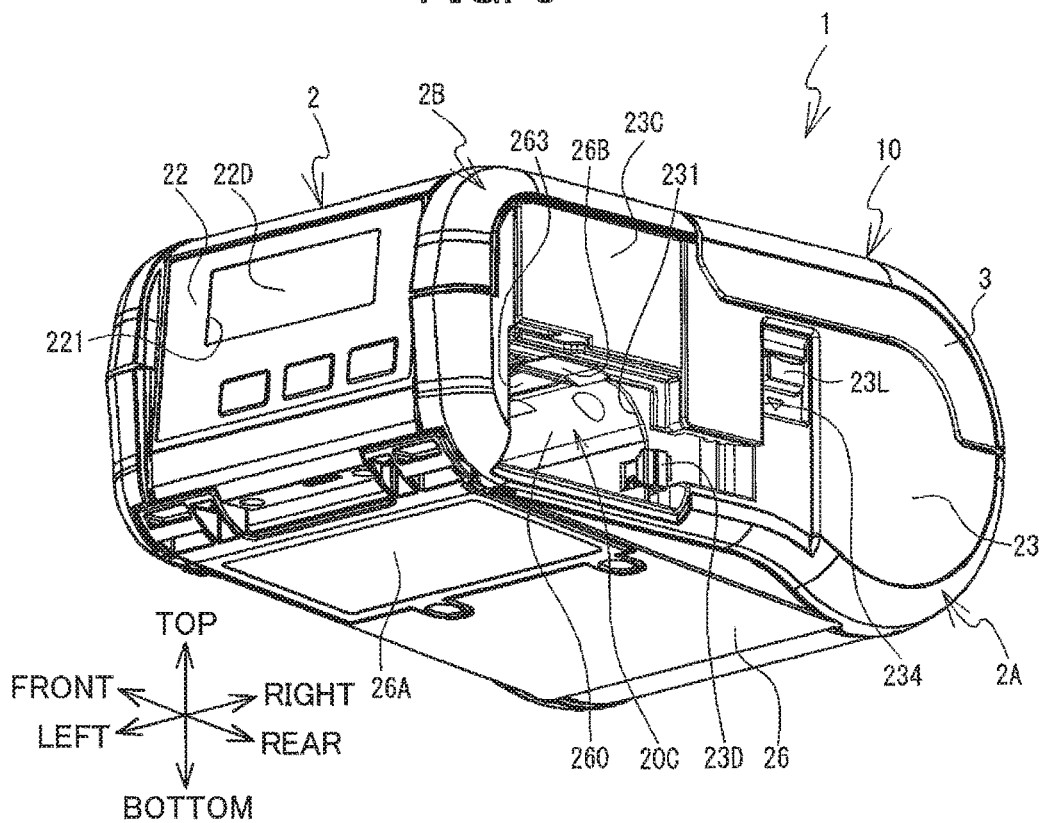
FIG. 5 is a perspective view of the printing device 1 of the printing device 1 according to the embodiment, from which a cover member 23B and a battery 5 are omitted.
Figure 6:
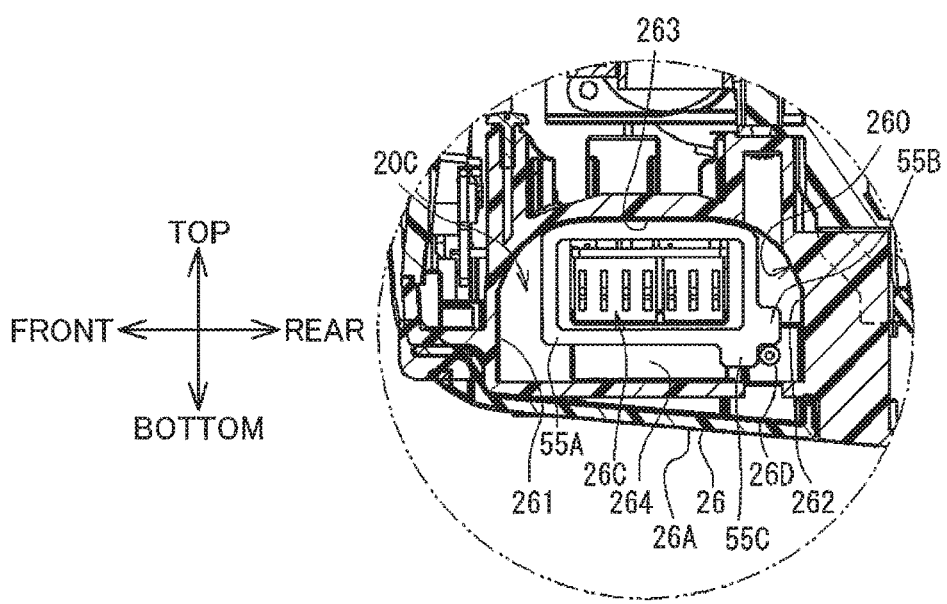
FIG. 6 is a cross-sectional view of a third accommodating section 20C of the printing device 1 according to the embodiment as viewed from a right side thereof.

As illustrated in FIG. 5, a recessed part 260 is formed in the bottom wall portion 26. The recessed part 260 is recessed upward. As illustrated in FIG. 3, the recessed part 260 is formed between left and right edges of the bottom wall portion 26 near the front edge thereof. As illustrated in FIG. 6, the recessed part 260 has first inner wall portions 261 and 262, a second inner wall portion 263, and a third inner wall portion 264. The first inner wall portions 261 and 262 opposes each other in the front-rear direction, with their respective surfaces facing in the corresponding rearward and forward directions. The first inner wall portion 261 is positioned forward relative to and is separated from the first inner wall portion 262. The second inner wall portion 263 is disposed between top edges of the first inner wall portions 261 and 262. Regions in which the first inner wall portions 261 and 262 connect to the second inner wall portion 263 are curved. The third inner wall portion 264 is disposed at left edges of the first inner wall portions 261 and 262 and a left edge of the second inner wall portion 263. As illustrated in FIG. 5, a cover member 26A is disposed at the bottom wall portion 26 for covering the recessed part 260 from below. The cover member 26A is detachably attached to the bottom wall portion 26. A space in the recessed part 260 covered by the cover member 26A is the third accommodating section 20C.

As illustrated in FIG. 5, a right end of the third accommodating section 20C is open and is in communication with the through-hole 231 formed in the right wall portion 23. A recessed part 26B is formed in a portion of the second inner wall portion 263 defining the third accommodating section 20C near an area of the third accommodating section 20C that communicates with the through-hole 231. The recessed part 26B is recessed upward and extends a prescribed length leftward from the portion of the third accommodating section 20C that communicates with the through-hole 231. As illustrated in FIG. 6, the third inner wall portion 264 closes a left end of the third accommodating section 20C. A terminal 26C and a spring 26D are provided on the third inner wall portion 264. The terminal 26C is disposed at a center region of the third inner wall portion 264. When the battery 5 described later (see FIG. 7) is accommodated into the third accommodating section 20C, the terminal 26C can contact an electrode 50 (see FIG. 8) of the battery 5. The spring 26D is provided at a position diagonally below and rearward of the terminal 26C. The spring 26D is a coil-shaped compression spring. A left end of the spring 26D is connected to the third inner wall portion 264, and the spring 26D extends rightward therefrom.

<Battery 5>

Figure 7:
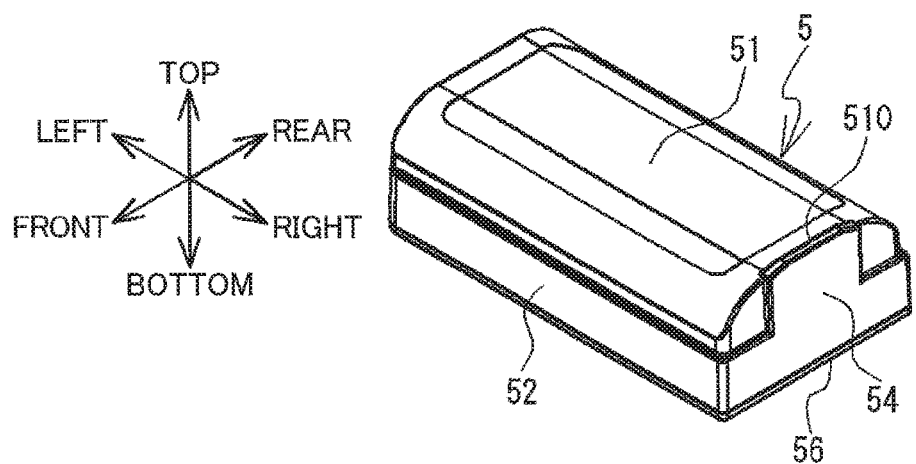
FIG. 7 is a perspective view of the battery 5 of the printing device 1 according to the embodiment.
Figure 8:
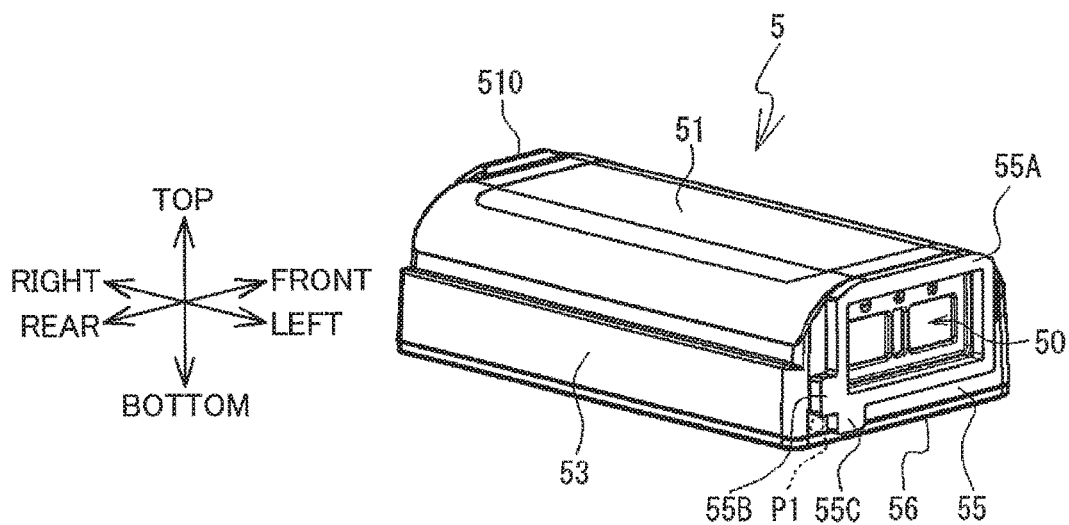
FIG. 8 is a perspective view of the battery 5 of the printing device 1 according to the embodiment.

As illustrated in FIGS. 7 and 8, the battery 5 has a general rectangular parallelepiped shape that is elongated in the left-right direction. The battery 5 is a secondary battery. The battery 5 supplies power to the control board 8 described later (see FIG. 21). In the following description, wall portions on a top side, a front side, a rear side, a right side, and a bottom side of the battery 5 will be respectively referred to as a top wall portion 51, a front wall portion 52, a rear wall portion 53, a right wall portion 54, a left wall portion 55, and a bottom wall portion 56. A cross section of the battery 5 taken along a plane orthogonal to the left-right direction is shaped substantially similar to a cross section of the third accommodating section 20C (see FIG. 6) taken along a plane orthogonal to the left-right direction.

As illustrated in FIG. 7, portions of the top wall portion 51 of the battery 5 at a front end portion and a rear end portion thereof are curved. A protruding part 510 that protrudes upward is provided at a right edge portion of the top wall portion 51 in an approximate front-rear center portion thereof, i.e., a portion at the right edge portion of the top wall portion 51 that extends linearly in the front-rear direction. The protruding part 510 is plate-shaped and has surfaces facing in leftward and rightward directions, respectively.

As illustrated in FIG. 8, the electrode 50 is provided at a center region of the left wall portion 55. Protruding parts 55A, 55B, and 55C are provided at the left wall portion 55 and protrude leftward therefrom. The protruding parts 55A, 55B, and 55C are formed of an elastic or resilient material. The protruding part 55A has a rectangular frame-like shape that surrounds the electrode 50. The protruding part 55B extends rearward from a rear edge of the protruding part 55A at a bottom end portion thereof. The protruding part 55C extends downward from a bottom edge of the protruding part 55A at a rear end portion thereof.

<Method of Inserting Battery 5>

Figure 9:
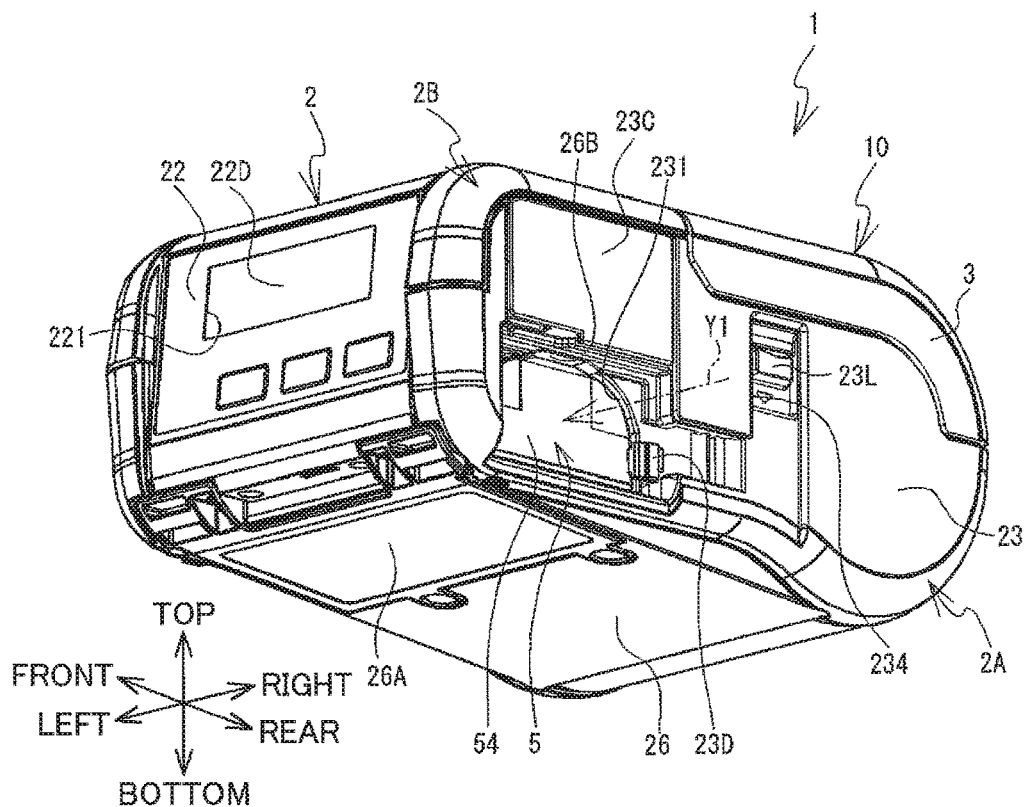
FIG. 9 is a perspective view of the printing device 1 according to the embodiment, in which the battery 5 is accommodated in the third accommodating section 20C.

As illustrated in FIG. 9, the battery 5 is inserted (in a direction indicated by an arrow Y1) into the third accommodating section 20C (see FIG. 5) through the through-hole 231 formed in the right wall portion 23 of the housing 10 while the left wall portion 55 on which the electrode 50 is disposed (see FIG. 8) is facing leftward. While the battery 5 is inserted, the locking mechanism 23D moves rearward against the urging force of the spring (not illustrated). Thus, the locking mechanism 23D does not hinder insertion of the battery 5. The front wall portion 52, the rear wall portion 53, the top wall portion 51, and the bottom wall portion 56 of the battery 5 (see FIG. 7) move leftward while in sliding contact with the first inner wall portion 261, the first inner wall portion 262, the second inner wall portion 263 (see FIG. 6), and the top surface of the cover member 26A defining the third accommodating section 20C, respectively. While the battery 5 is moving leftward, the protruding part 510 on the right end of the battery 5 (see FIG. 7) is fitted into the recessed part 26B of the third accommodating section 20C.

Further, when the battery 5 moves further leftward, the right wall portion 54 of the battery 5 moves to a position substantially flush with the through-hole 231. The protruding parts 55A, 55B, and 55C of the left wall portion 55 (see FIG. 8) contact the third inner wall portion 264 defining the third accommodating section 20C from right. Since the protruding parts 55A, 55B, and 55C have elasticity, the protruding parts 55A, 55B, and 55C compressively deform to soften the impact of this contact. Further, the spring 26D in the third accommodating section 20C (see FIG. 6) contacts a part P1 (see FIG. 8) of the left wall portion 55 constituting the battery 5. The part P1 of the left wall portion 55 is positioned below the protruding part 55B and rearward relative to the protruding part 55C. The spring 26D compressively deforms when contacted by the battery 5 and urges the battery 5 rightward. Note that while the battery 5 is not illustrated in FIG. 6, the shapes of the protruding parts 55A, 55B, and 55C are depicted in the drawing to illustrate their positional relationships with the spring 26D.

At this time, the protruding part 510 of the battery 5 is positioned so as not to contact a left end of the recessed part 26B formed in the third accommodating section 20C, and the right wall portion 54 of the battery 5 is positioned slightly leftward relative to the through-hole 231. The locking mechanism 23D is moved forward by the urging force of the spring (not illustrated) and protrudes farther forward than the rear edge of the through-hole 231. The locking mechanism 23D restrains the battery 5 from coming out of the third accommodating section 20C. Further, the battery 5 is urged rightward against the locking mechanism 23D by the urging force of the spring 26D. In this way, the battery 5 is securely retained in the third accommodating section 20C.

The electrode 50 on the left wall portion 55 of the battery 5 (see FIG. 8) contacts the terminal 26C on the third inner wall portion 264 defining the third accommodating section 20C (see FIG. 6). The battery 5 can supply power to the printing device 1 via the electrode 50 and the terminal 26C. Hence, the printing device 1 is driven by power supplied from the battery 5.

<Second Cover 3>

As illustrated in FIGS. 1 and 2, the second cover 3 can pivotally move between a position covering the open area 2C (see FIG. 2) from above and a position uncovering the open area 2C. In the following description, a state where the second cover 3 covers the open area 2C (see FIG. 1), that is, a state where the second cover 3 is closed, will be referred to as a closed state, and a state where the second cover 3 does not cover the open area 2C (see FIG. 2), that is, a state where the second cover 3 is open, will be referred to as an open state. Further, directions relative to the printing device 1 will be applied to the second cover 3 in the following description under the assumption that the second cover 3 is in the closed state (see FIG. 1). Further, unless otherwise specified, rotating directions in the following description will indicate a direction of rotation when a rotating object is viewed from a right side thereof (clockwise or counterclockwise).

As illustrated in FIG. 2, the second cover 3 has a cover plate part 31, and side plate parts 33 and 34. The cover plate part 31 is plate-shaped with a curved portion. As illustrated in FIG. 2, the cover plate part 31 has protruding parts 311 on a rear edge portion thereof. The protruding parts 311 respectively have holes in which the two shafts 252 of the first cover 2 (see FIG. 3) are inserted. The side plate part 33 is connected to a right edge of the cover plate part 31. The side plate part 33 curves while extending downward from the cover plate part 31. The side plate part 34 is connected to a left edge of the cover plate part 31. The side plate part 34 curves while extending downward from the cover plate part 31.

Figure 10:
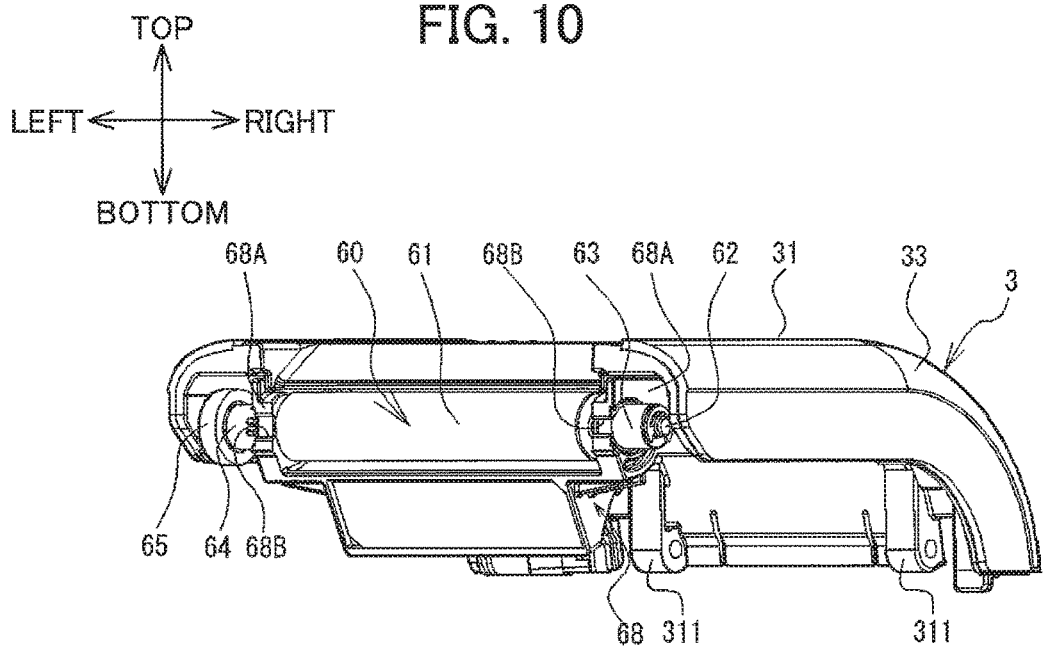
FIG. 10 is a perspective view of a second cover 3 of the printing device 1 according to the embodiment.

As illustrated in FIGS. 2 and 10, a platen holder 68 is provided on an inner surface of the cover plate part 31 near a front edge thereof. The platen holder 68 is fixed to the cover plate part 31 by screws 681A on left and right sides of the platen holder 68. As illustrated in FIG. 10, the platen holder 68 has shaft retaining parts 68A at a front end portion thereof, with one on each of left and right sides. Each shaft retaining part 68A has a recessed part 68B that is recessed rearward from a front edge thereof. The platen holder 68 rotatably holds a platen body 60 described later.

The second cover 3 is pivotally movably supported to the first cover 2 and can pivotally move about the shafts 252 inserted through the holes formed in the protruding parts 311. The springs 253 (see FIG. 3) mounted on the shafts 252 urge the second cover 3 from its closed state (see FIG. 1) to its open state (see FIG. 2). When the second cover 3 is pivotally moved counterclockwise against the urging force of the springs 253, the second cover 3 moves to the closed state (FIG. 1) and covers the open area 2C formed in the first cover 2 from above. When the second cover 3 is in the closed state illustrated in FIG. 1, the front edge portion of the cover plate part 31 is adjacent to the edge part 21A of the top wall portion 21 constituting the first cover 2. A discharge opening 20 is formed between the edge part 21A of the top wall portion 21 and the front edge portion of the cover plate part 31. Printing medium printed inside the printing device 1 is subsequently discharged from the printing device 1 through the discharge opening 20. When the second cover 3 is pivotally moved clockwise by the urging force of the springs 253, the second cover 3 is moved to the open state illustrated in FIG. 2. At this time, the second cover 3 does not cover the open area 2C formed in the first cover 2.

<Platen Body 60>

As illustrated in FIG. 10, the platen body 60 has a platen 61, a platen shaft 62, platen bearings 63 and 64, and a gear 65. The platen 61 is a columnar-shaped member that extends in the left-right direction. The platen shaft 62 is a columnar-shaped member having a diameter smaller than that of the platen 61. The platen shaft 62 extends in the left-right direction, penetrating a center of the platen 61 in the left-right direction. Left and right end portions of the platen shaft 62 protrude outward from left and right ends of the platen 61, respectively. The platen 61 is fixed to the platen shaft 62.

Figure 11:
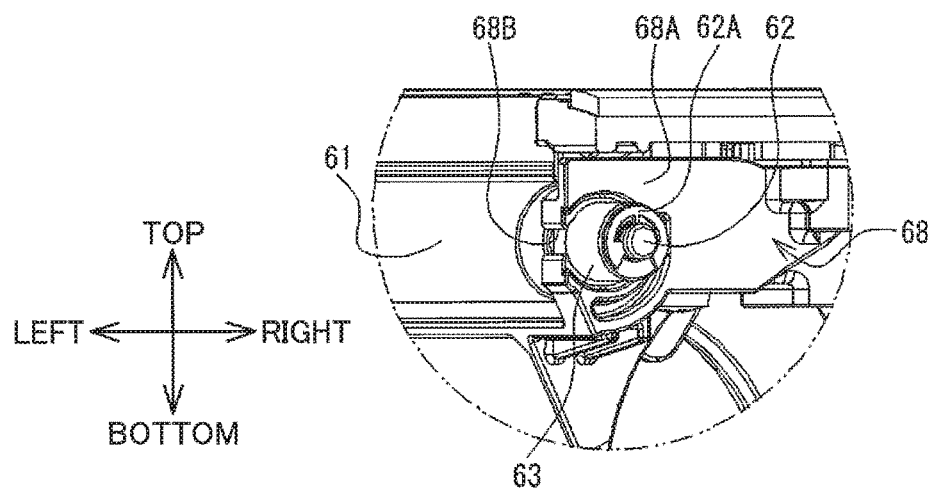
FIG. 11 is a partial enlarged perspective view of the second cover 3 illustrated in FIG. 10.

As illustrated in FIG. 11, the platen bearing 63 is disposed at a part of the platen shaft 62 that protrudes from the right end of the platen 61. The platen bearing 63 is a columnar-shaped member having a diameter larger than that of the platen shaft 62. A through-hole is formed in the platen bearing 63, penetrating a center of the platen bearing 63 in the left-right direction. The platen shaft 62 is inserted through this through-hole from a left side thereof. The platen bearing 63 can rotate relative to the platen shaft 62. A snap ring 62A clamped on the right end portion of the platen shaft 62 prevents the platen bearing 63 from coming off the platen shaft 62.

As illustrated in FIG. 10, the platen bearing 64 is disposed at a part of the platen shaft 62 that protrudes from the left end of the platen 61. The platen bearing 64 has a shape the same as that of the platen bearing 63. The gear 65 is disposed on a left side relative to the platen bearing 64. The gear 65 is a spur gear having a diameter larger than that of the platen bearing 64. The gear 65 is fixed to the left end portion of the platen shaft 62.

As illustrated in FIG. 11, an approximately left half portion of the platen bearing 63 is engaged in the recessed part 68B of the shaft retaining part 68A on the right end portion of the platen holder 68. As illustrated in FIG. 10, an approximately right half portion of the platen bearing 64 is engaged in the recessed part 68B of the shaft retaining part 68A on the left end portion of the platen holder 68. The platen bearings 63 and 64 rotatably retain the platen 61 while engaged in the corresponding recessed parts 68B of the shaft retaining parts 68A. Through the platen holder 68 at the front end portion of the second cover 3, the second cover 3 rotatably supports the platen 61.

<First Frame Member 7>

Figure 12:
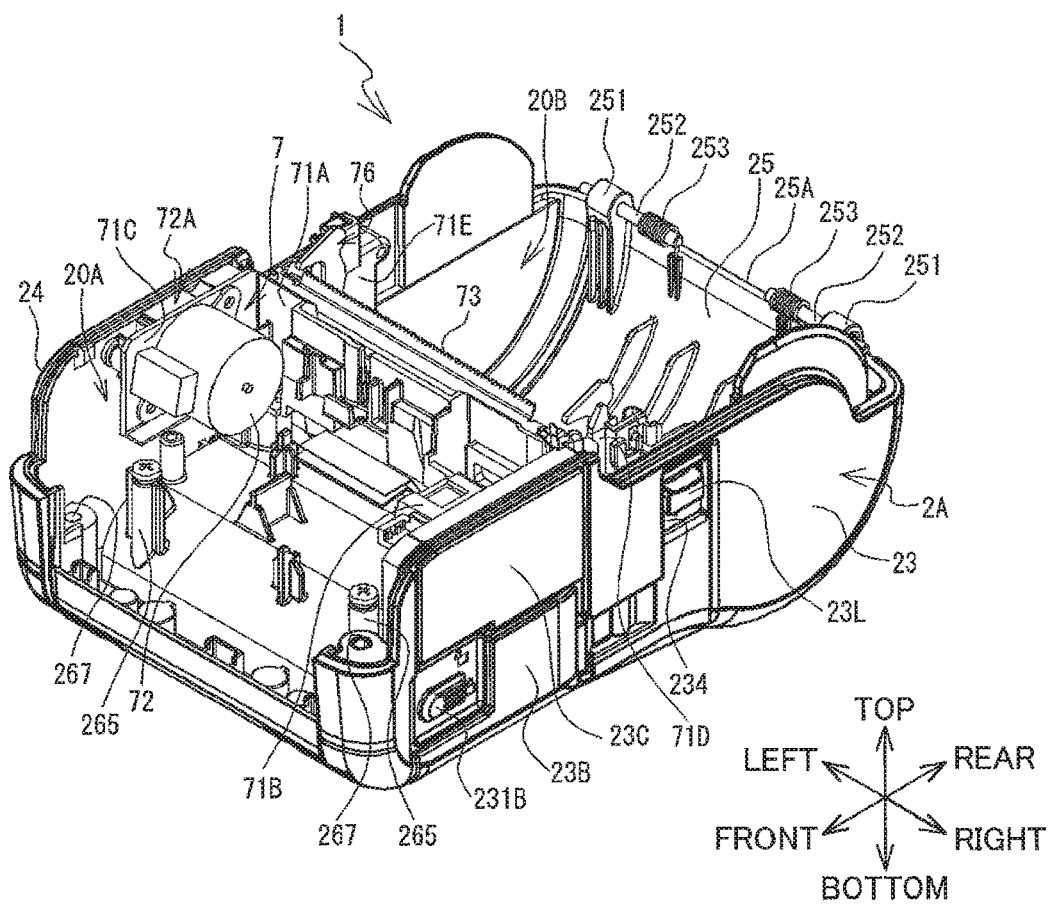
FIG. 12 is a perspective view of the first bottom cover 2A and a first frame member 7 of the printing device 1 according to the embodiment.

As illustrated in FIG. 12, the first frame member 7 is accommodated inside the first cover 2 at a bordering area of the first accommodating section 20A and the second accommodating section 20B. That is, the first frame member 7 is accommodated in the first cover 2 at an approximate front-rear center region of the first cover 2. The first frame member 7 is arranged juxtaposed with the second frame member 4 in the front-rear direction. The first frame member 7 is positioned forward relative to the second frame member 4 described later (see FIG. 19). The first frame member 7 retains a motor 72, a thermal head 74A (see FIG. 14), an engaging member 76 (see FIG. 16), the lever 23L, and the like. The first frame member 7 has support parts 71A, 71B, 71C, 71D, and 71E (hereinafter collectively referred to as a "support part 71").

The support part 71A is retained in an approximate front-rear center portion of the first bottom cover 2A. The support part 71A is accommodated in the interior of the first bottom cover 2A near a rear edge portion of the first accommodating section 20A (see FIG. 12). The second accommodating section 20B (see FIG. 12) is arranged on a rear side relative to the support part 71A. The support part 71A is disposed below the discharge opening 20 (see FIG. 1) formed when the second cover 3 is in the closed state.

Figure 13:
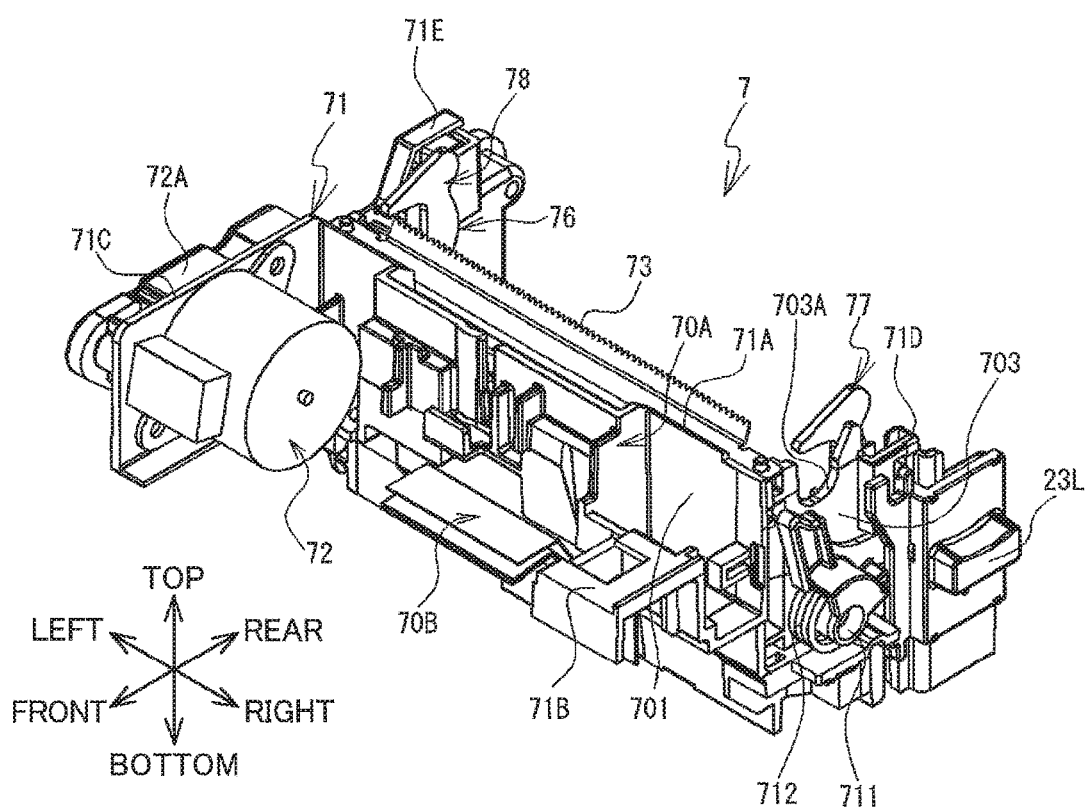
FIG. 13 is a perspective view of the first frame member 7 of the printing device 1 according to the embodiment.

As illustrated in FIG. 13, the support part 71A is primarily configured of a plate member 701 arranged orthogonal to the front-rear direction. An approximate left-right center region of the plate member 701 bends forward in a convex shape. Hereinafter, this convex-shaped portion will be referred to as a protruding part 70A. The support part 71A also has a protruding part 70B positioned below the protruding part 70A. The protruding part 70B has a flat plate shape and protrudes forward. The protruding part 70B has surfaces that face in upward and downward directions, respectively.

Figure 14:
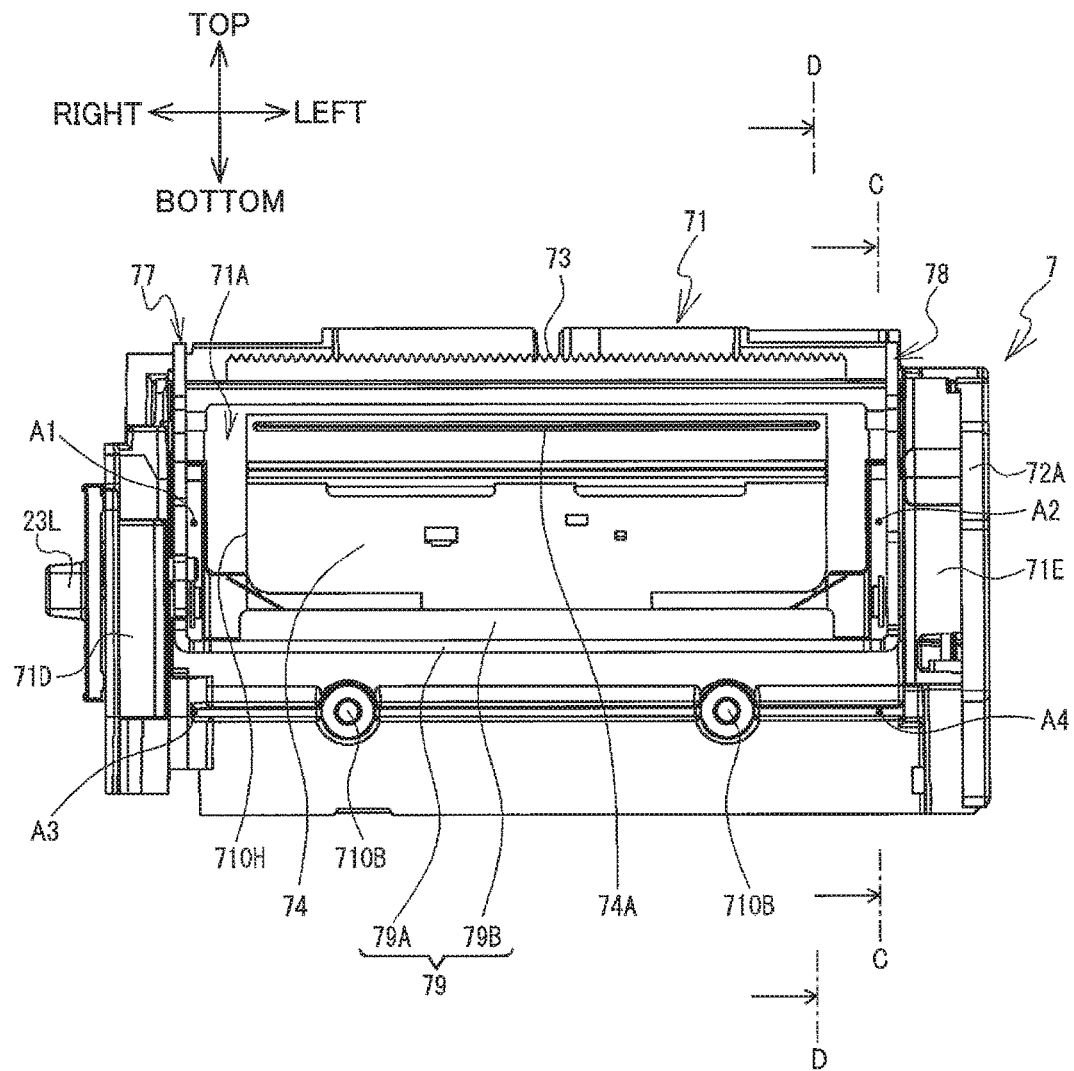
FIG. 14 is a rear side view of the first frame member 7 of the printing device 1 according to the embodiment.
Figure 15:
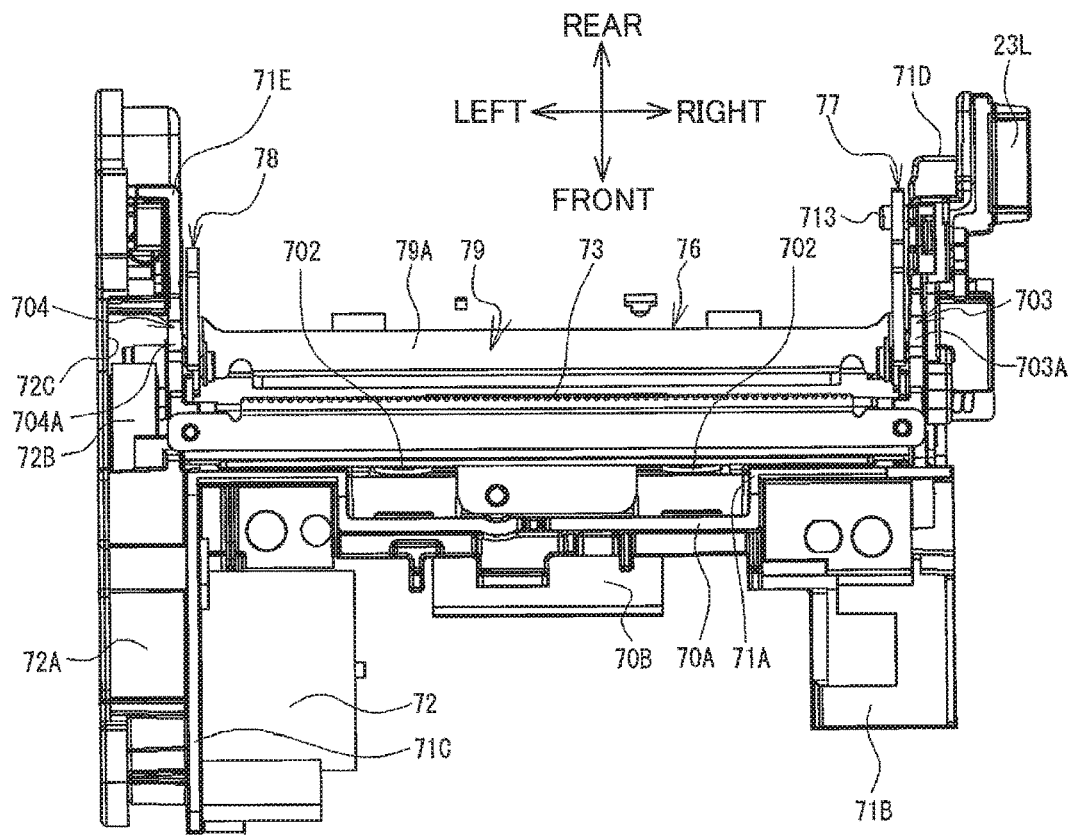
FIG. 15 is a top plan view of the first frame member 7 of the printing device 1 according to the embodiment.

As illustrated in FIG. 14, the support part 71A has a rectangular open area 710H. A movable plate 74 is retained inside the open area 710H. The movable plate 74 has surfaces that face in the frontward and rearward directions, respectively. the thermal head 74A is provided on a rear surface of the movable plate 74. The thermal head 74A prints characters and the like by applying heat to the printing medium. The thermal head 74A is elongated in the left-right direction. As illustrated in FIG. 15, two springs 702 extend rearward from a rear surface of the protruding part 70A constituting the plate member 701. Rear ends of the two springs 702 are connected to a front end of the movable plate 74 (see FIG. 14). The movable plate 74 is supported by the springs 702 so as to be movable in the front-rear direction. The springs 702 can urge the movable plate 74 rearward.

As illustrated in FIG. 14, a cutting part 73 is provided above and along a top end of the movable plate 74. The cutting part 73 is a blade that can cut off a portion of the printing medium that has been printed by the thermal head 74A. The cutting part 73 extends in the left-right direction. Two threaded holes 710B are formed in the support part 71A at a position downward relative to the movable plate 74. The threaded holes 710B are positioned apart from each other in the left-right direction.

As illustrated in FIG. 13, the support part 71B extends forward from a right end portion of the support part 71A. The support part 71B is disposed leftward relative to the through-holes 232 and 233 (see FIG. 3) of the right wall portion 23 constituting the first bottom cover 2A. The support part 71B retains a USB socket (not illustrated) mounted on a control board 82 (see FIG. 21) and a power supply socket (not illustrated) mounted on a control board 81 (see FIG. 21).

The support part 71C extends forward from a left end portion of the support part 71A. The support part 71C is a flat plate-shaped member that is oriented orthogonal to the left-right direction. The motor 72 is fixed to a right surface of the support part 71C. A rotating shaft of the motor 72 extends leftward and protrudes leftward from the support part 71C. A gear box 72A is fixed to a left surface of the support part 71C. The gear box 72A has a box-like shape that accommodates a plurality of linked gears (only one of which, a gear 72B, is illustrated). One of the linked gears is meshedly engaged with a gear (not illustrated) coupled with the rotating shaft of the motor 72. As illustrated in FIG. 15, an open area 72C is formed in a top portion of the gear box 72A at a position near a rear end thereof. A gear 72B constituting one of the plurality of linked gears in the gear box 72A is exposed to an outside through the open area 72C. The gear 72B is a spur gear whose rotational axis extends in the left-right direction. When the motor 72 is rotated, the plurality of linked gears in the gear box 72A rotates, causing the gear 72B to rotate in response.

As illustrated in FIG. 13, the support part 71D extends rearward from the right end portion of the support part 71A. The support part 71E extends rearward from the left end portion of the support part 71A. Each of the support part 71D and the support part 71E is primarily configured of a flat plate-shaped member that is oriented orthogonal to the left-right direction. The support part 71D has a plate-shaped part 703 that extends rearward from the right end portion of the support part 71A. A recessed part 703A is formed in the plate-shaped part 703 and is recessed downward from a top edge of the plate-shaped part 703. As illustrated in FIG. 15, the support part 71E has a plate-shaped part 704 having a shape the same as that of the plate-shaped part 703. The plate-shaped part 704 extends rearward from the left end portion of the support part 71A. A recessed part 704A having a shape the same as that of the recessed part 703A is formed in a top edge of the plate-shaped part 704. The engaging member 76 described later is disposed in an area between the plate-shaped part 703 and the plate-shaped part 704 in the left-right direction.

<Engaging Member 76>

Figure 16:
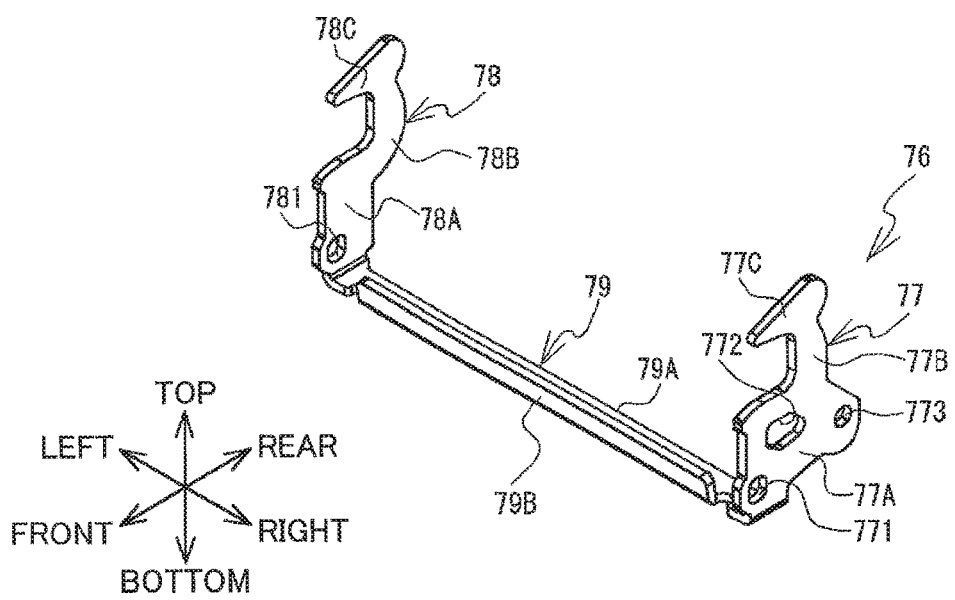
FIG. 16 is a perspective view of an engaging member 76 of the printing device 1 according to the embodiment.

As illustrated in FIG. 16, the engaging member 76 has first engaging parts 77 and 78, and a second engaging part 79. The first engaging parts 77 and 78 have a flat plate shape, with their surfaces facing in the leftward and rightward directions, respectively. The first engaging parts 77 and 78 are separated from each other in the left-right direction. A distance between the first engaging parts 77 and 78 in the left-right direction is approximately equal to a distance between the plate-shaped part 703 of the support part 71D (see FIG. 15) and the plate-shaped part 704 of the support part 71E (see FIG. 15) in the left-right direction. The first engaging part 77 is disposed on a right side relative to the first engaging part 78.

The first engaging part 77 has a base part 77A, an extension part 77B, and a protruding part 77C. The base part 77A has through-holes 771, 772, and 773. The through-hole 771 is formed near a front edge of the base part 77A and a bottom edge of the base part 77A. In other words, the through-hole 771 is formed at a lower-front corner portion of the base part 77A. The through-hole 772 is formed obliquely above and rearward of the through-hole 771. The through-hole 773 is formed rearward of the through-hole 772. The extension part 77B extends upward from a top end of the base part 77A at a position rearward of a front-rear center portion thereof. The protruding part 77C is provided on a top end of the extension part 77B and extends forward. A top edge of the protruding part 77C slopes diagonally downward from a rear side toward a front side thereof. A rear edge of the first engaging part 77 is recessed forward in portion corresponding to the extension part 77B relative to portions corresponding to the base part 77A and the protruding part 77C.

The first engaging part 78 has a shape substantially the same as that of the first engaging part 77. That is, the first engaging part 78 has a base part 78A, an extension part 78B, and a protruding part 78C that correspond to the base part 77A, the extension part 77B, and the protruding part 77C of the first engaging part 77. The first engaging part 78 differs from the first engaging part 77 in the shape of the base part 78A. A rear edge of the base part 78A is recessed farther forward than a rear edge of the extension part 78B. The base part 78A has only a single through-hole 781 that corresponds to the through-hole 771 of the first engaging part 77.

The second engaging part 79 extends between the first engaging parts 77 and 78 and connects the first engaging part 77 to the first engaging part 78. The second engaging part 79 has connecting parts 79A and 79B. The connecting part 79A has a plate shape that is elongated in the left-right direction. The connecting part 79A has surfaces that face in the upward and downward directions, respectively. The connecting part 79A extends between a bottom edge of the first engaging part 77 and a bottom edge of the first engaging part 78. The connecting part 79B extends upward from a front edge of the connecting part 79A. The connecting part 79B has a plate shape whose surfaces face in the frontward and rearward directions, respectively.

As illustrated in FIG. 15, the first engaging part 77 is disposed at a position leftward relative to the plate-shaped part 703 constituting the support part 71D. The first engaging part 78 is disposed at a position rightward relative to the plate-shaped part 704 constituting the support part 71E. As illustrated in FIG. 14, the second engaging part 79 is disposed at a position rearward relative to the support part 71A.

Figure 17:
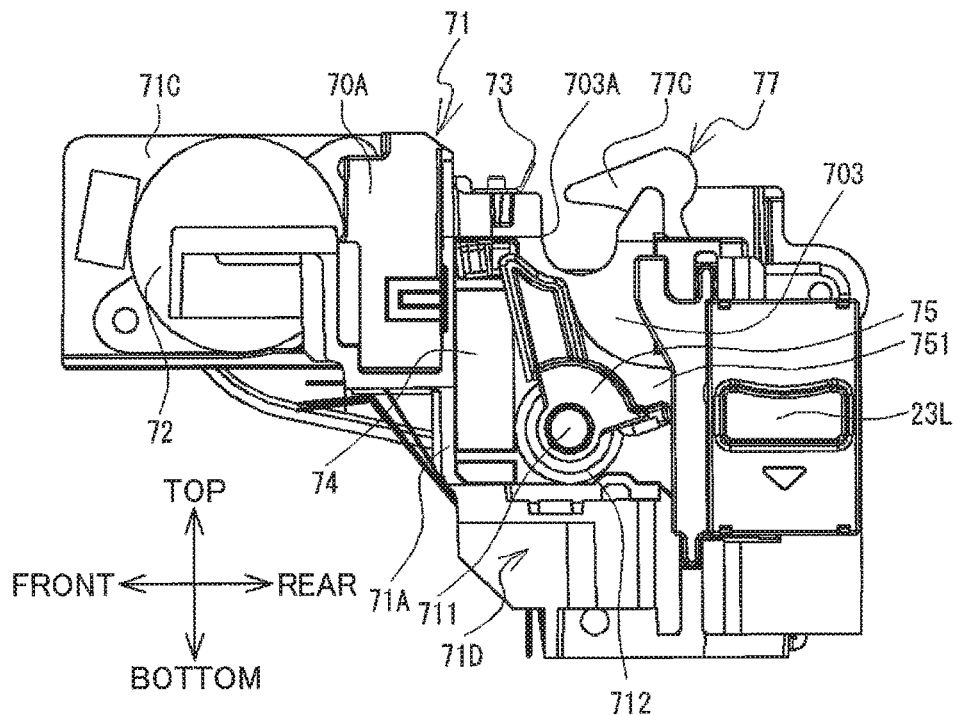
FIG. 17 is a right side view of the first frame member 7 of the printing device 1 according to the embodiment, in which the engaging member 76 is at the first position.
Figure 18:
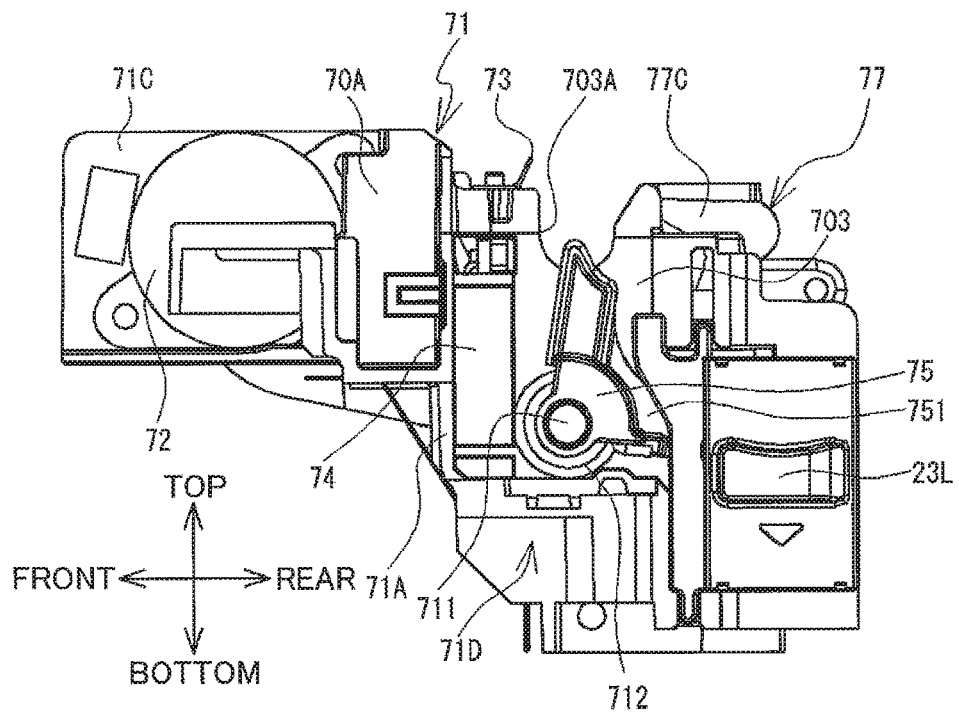
FIG. 18 is a right side view of the first frame member 7 of the printing device 1 according to the embodiment, in which the engaging member 76 is at the second position.

As illustrated in FIGS. 17 and 18, a shaft part 711 retained in the support part 71D. The shaft part 711 is inserted in the left-right direction through the through-hole 771 formed in the base part 77A of the first engaging part 77 (see FIG. 16). The first engaging part 77 is rotatably supported about the shaft part 711. A release cam 75 is rotatably supported on the shaft part 711. A spring 712 is mounted on a proximal portion of the release cam 75. The spring 712 urges the release cam 75 in the counterclockwise direction. While not illustrated in the drawings, a shaft part retained in the support part 71E is inserted in the left-right direction through the through-hole 781 formed in the base part 78A of the first engaging part 78 (see FIG. 16). The first engaging part 78 is rotatably supported about this shaft part.

An arm part 751 is provided at the release cam 75. The arm part 751 extends in the rearward direction. On a distal edge of the arm part 751 are provided a first protruding part (not illustrated) that protrudes in the rightward direction, and a second protruding part 713 (see FIG. 15) that protrudes in the leftward direction. The first protruding part of the arm part 751 engages with the lever 23L. The second protruding part 713 is inserted through the through-hole 773 formed in the base part 77A of the first engaging part 77 (see FIG. 16) from a right side thereof. When the lever 23L is moved in the up-down direction, the release cam 75 rotates via the first protruding part, causing the second protruding part 713 to move in the up-down direction. The position of the through-hole 773 moves in the up-down direction in response to the movement of the second protruding part 713. The first engaging part 77 rotates about the shaft part 711 in response to the up-down movement of the through-hole 773. When the first engaging part 77 rotates, the first engaging part 78 connected to the first engaging part 77 through the second engaging part 79 (see FIG. 16) also rotates in the same direction. The spring 712 urges the lever 23L upward via the release cam 75 and also urges the first engaging parts 77 and 78 in the counterclockwise direction.

When a downward force is not being applied to the lever 23L, the urging force of the spring 712 rotates the engaging member 76 counterclockwise. As illustrated in FIG. 17, the protruding part 77C of the first engaging part 77 moves forward to a position above the recessed part 703A formed in the plate-shaped part 703 of the support part 71D. While not illustrated in the drawings, at this time, the protruding part 78C of the first engaging part 78 is positioned above the recessed part 704A formed in the plate-shaped part 704 of the support part 71E. Hereinafter, the state illustrated in FIG. 17 in which the engaging member 76 is rotated counterclockwise will be referred to as the "first state," and the position of the engaging member 76 (the first engaging parts 77 and 78) in the first state will be referred to as the "first position."

When a downward force is applied to the lever 23L, the engaging member 76 rotates clockwise against the urging force of the spring 712. As illustrated in FIG. 18, the protruding part 77C of the first engaging part 77 moves rearward to a position rearward relative to the recessed part 703A formed in the plate-shaped part 703. While not illustrated in the drawings, at this time, the protruding part 78C of the first engaging part 78 is also positioned rearward relative to the recessed part 704A formed in the plate-shaped part 704. Hereinafter, the state illustrated in FIG. 18 in which the engaging member 76 is rotated clockwise will be referred to as the "second state," and the position of the engaging member 76 (the first engaging parts 77 and 78) in the second state will be referred to as the "second position."

<Opening and Closing Operations of Second Cover 3>

Figure 19:
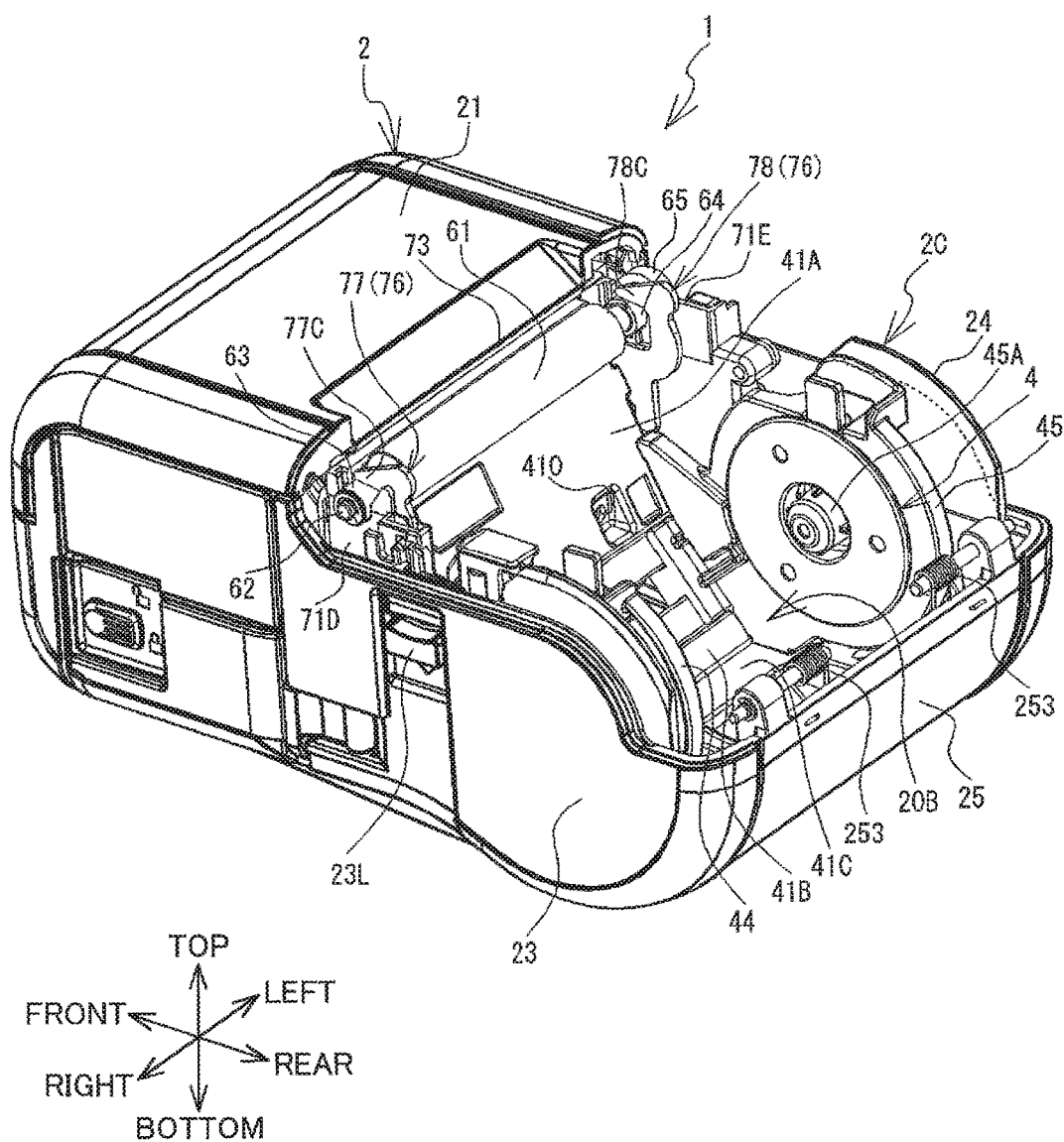
FIG. 19 is a perspective view of the printing device 1 according to the embodiment, from which the second cover 3 is omitted.

When the second cover 3 is in the closed state (see FIG. 1), the platen bearing 63 on the right side relative to the platen 61 is engaged from above in the recessed part 703A (see FIG. 13) formed in the support part 71D of the first frame member 7, as illustrated in FIG. 19. With the first engaging part 77 disposed in the first position, the protruding part 77C contacts the platen bearing 63 from above. The platen bearing 64 on the left side relative to the platen 61 is engaged from above in the recessed part 704A (see FIG. 15) formed in the support part 71E of the first frame member 7. With the first engaging part 78 disposed in the first position, the protruding part 78C contacts the platen bearing 64 from above. In this way, the engaging member 76 restricts upward movement of the platen body 60. The engaging member 76 maintains the second cover 3 in the closed state and restricts the second cover 3 from being pivotally moved clockwise toward the open state by the urging force of the springs 253.

Figure 20:
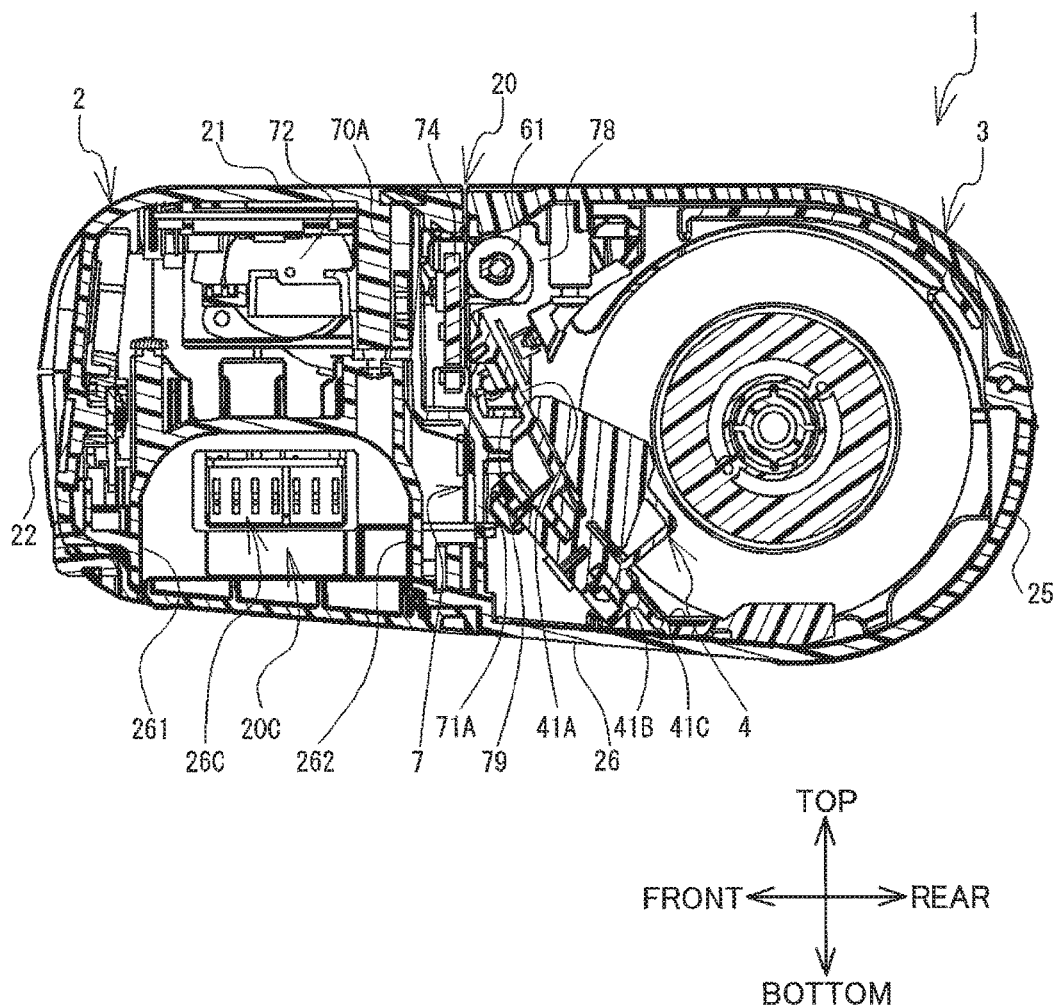
FIG. 20 is a cross-sectional view of the printing device 1 according to the embodiment, taken along a line A-A in FIG. 1.

When the second cover 3 is in the closed state illustrated in FIG. 20, the platen 61 is adjacent to a rear end of the thermal head 74A (see FIG. 14) provided on the movable plate 74 of the first frame member 7. When a printing medium is disposed between the platen 61 and the thermal head 74A, the platen 61 can press the printing medium forward against the thermal head 74A. As illustrated in FIG. 19, the gear 65 on the left side relative to the platen 61 is engaged with the gear 72B (see FIG. 15) provided on the first frame member 7. When the gear 72B rotates in response to rotation of the motor 72 (see FIG. 15), the gear 65 and the platen 61 rotate in association with the gear 72B. At this time, the platen 61 can convey the printing medium toward the discharge opening 20 while pressing the printing medium against the thermal head 74A, as illustrated in FIG. 20.

As an example, when the second cover 3 is in the closed state and an operation is performed to move the lever 23L (see FIG. 1) downward, the first engaging parts 77 and 78 move to the second position. In this case, the protruding part 77C of the first engaging part 77 is disposed at a position rearward relative to the recessed part 703A formed in the support part 71D, and the protruding part 78C of the first engaging part 78 is disposed at a position rearward relative to the recessed part 704A formed in the support part 71E, as illustrated in FIG. 18. Thus, the engaging member 76 no longer restricts upward movement of the platen bearings 63 and 64. Consequently, the urging force of the springs 253 pivotally moves the second cover 3 clockwise. When the second cover 3 is pivotally moved clockwise, the second cover 3 moves to its open state (see FIG. 2).

Hence, when the engaging member 76 is in the first position, the engaging member 76 is in engagement with the second cover 3 to close the second cover 3. Further, when the engaging member 76 is in the second position, the engaging member 76 is out of engagement with the second cover 3 to open the second cover 3.

<Control Board 8>

Figure 21:
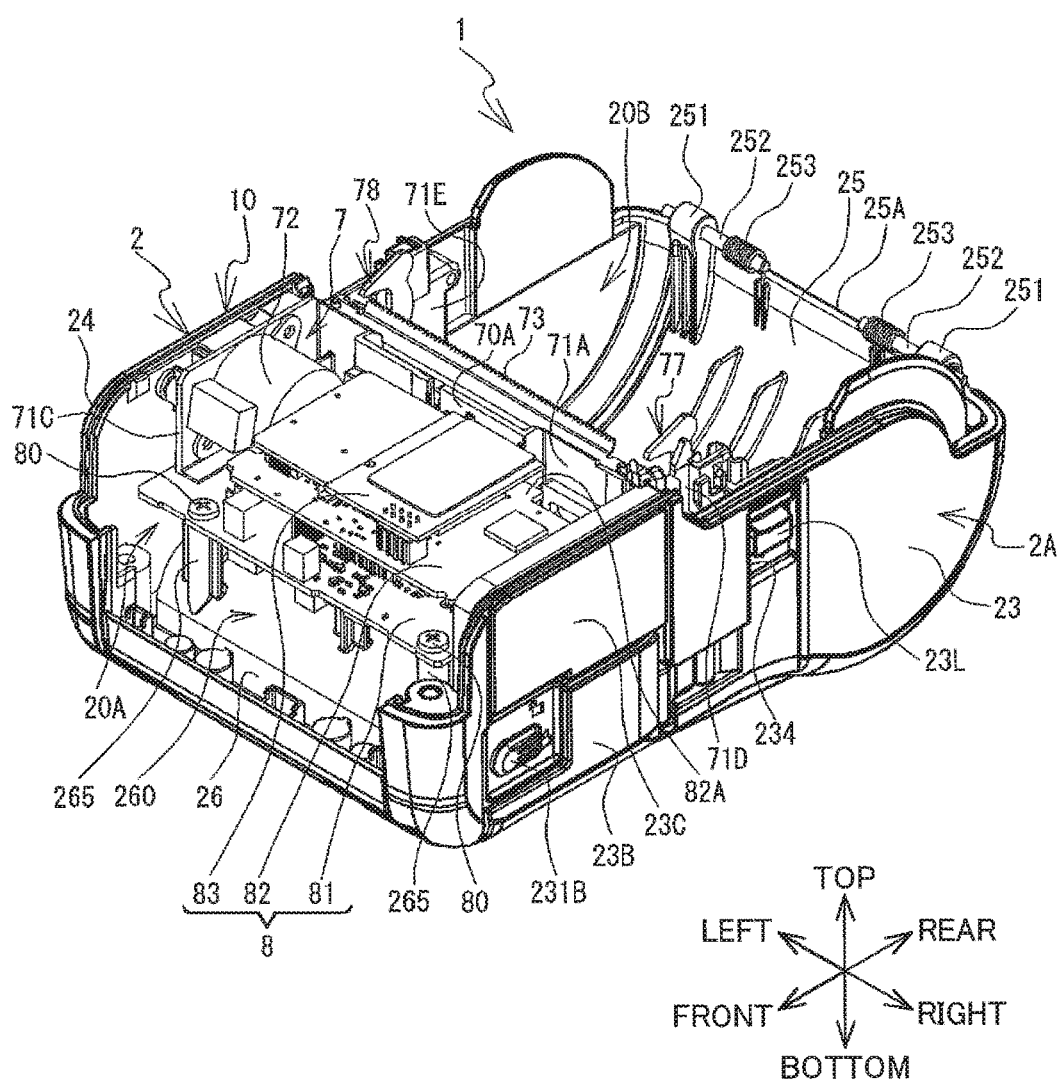
FIG. 21 is a perspective view of the first bottom cover 2A, the first frame member 7, and a control board 8 of the printing device 1 according to the embodiment.

As illustrated in FIG. 21, control boards 81, 82, and 83 are accommodated in the first accommodating section 20A. The control boards 81, 82, and 83 are stacked vertically so that spaces are formed between the boards. The control boards 81, 82, and 83 have surfaces that face in the upward and downward directions, respectively. The control boards 81, 82, and 83 have rectangular plate shapes. The control boards 81, 82, and 83 are arranged in the order given from bottom to top. Hereinafter, the control boards 81, 82, and 83 will be collectively referred to as the "control board 8."

Primarily, a power supply circuit that supplies power to the motor 72 and the thermal head 74A (see FIG. 14) is mounted on the control board 81. A rear edge of the control board 81 is disposed near a front end portion of the protruding part 70A formed on the support part 71A of the first frame member 7. A right edge of the control board 81 is arranged below the support part 71B of the first frame member 7 (see FIG. 13). A power supply socket mounted on a top surface of the control board 81 near a right edge portion thereof is supported from above by the support part 71B. The power supply socket is exposed to an outside through the through-hole 233 formed in the right wall portion 23 (see FIG. 3). A left edge of the control board 81 is disposed below the motor 72. The control board 81 is arranged above the recessed part 260 formed in the bottom wall portion 26 of the first bottom cover 2A and covers from above the entire portion of the bottom wall portion 26 forward relative to the support part 71A of the first frame member 7.

As illustrated in FIG. 21, two through-holes are formed through the control board 81 near a front edge thereof, with one on a left side and one on a right side of the control board 81. Screws 80 are inserted through the through-holes from above. The screws 80 inserted through the through-holes formed in the control board 81 are screwed into the threaded holes formed on the top ends of the extension parts 265, thereby fixing the front edge portion of the control board 81 to the first bottom cover 2A. A rear edge portion of the control board 81 is supported from below by the protruding part 70B provided on the support part 71A of the first frame member 7.

As illustrated in FIG. 21, the control board 82 has a left-right dimension smaller than a left-right dimension of the control board 81. A rear edge of the control board 82 is disposed near the front end portion of the protruding part 70A formed on the support part 71A of the first frame member 7. A left edge of the control board 82 is positioned on a right side relative to the motor 72. A right edge of the control board 82 is disposed above the support part 71B of the first frame member 7 (see FIG. 13). A CPU and the like for performing overall control of the printing device 1 are mounted on the control board 82. A USB socket mounted on a bottom surface of the control board 82 near a right edge thereof is supported from below by the support part 71B. The USB socket is exposed to an outside through the through-hole 232 formed in the right wall portion 23. A connector mounted on the bottom surface of the control board 82 is connected with a connector mounted on the top surface of the control board 81. The CPU and the like mounted on the control board 82 are electrically connected via these connectors to the power supply circuit and the like mounted on the control board 81. The control board 82 is supported on the control board 81 through these connectors.

Figure 22:
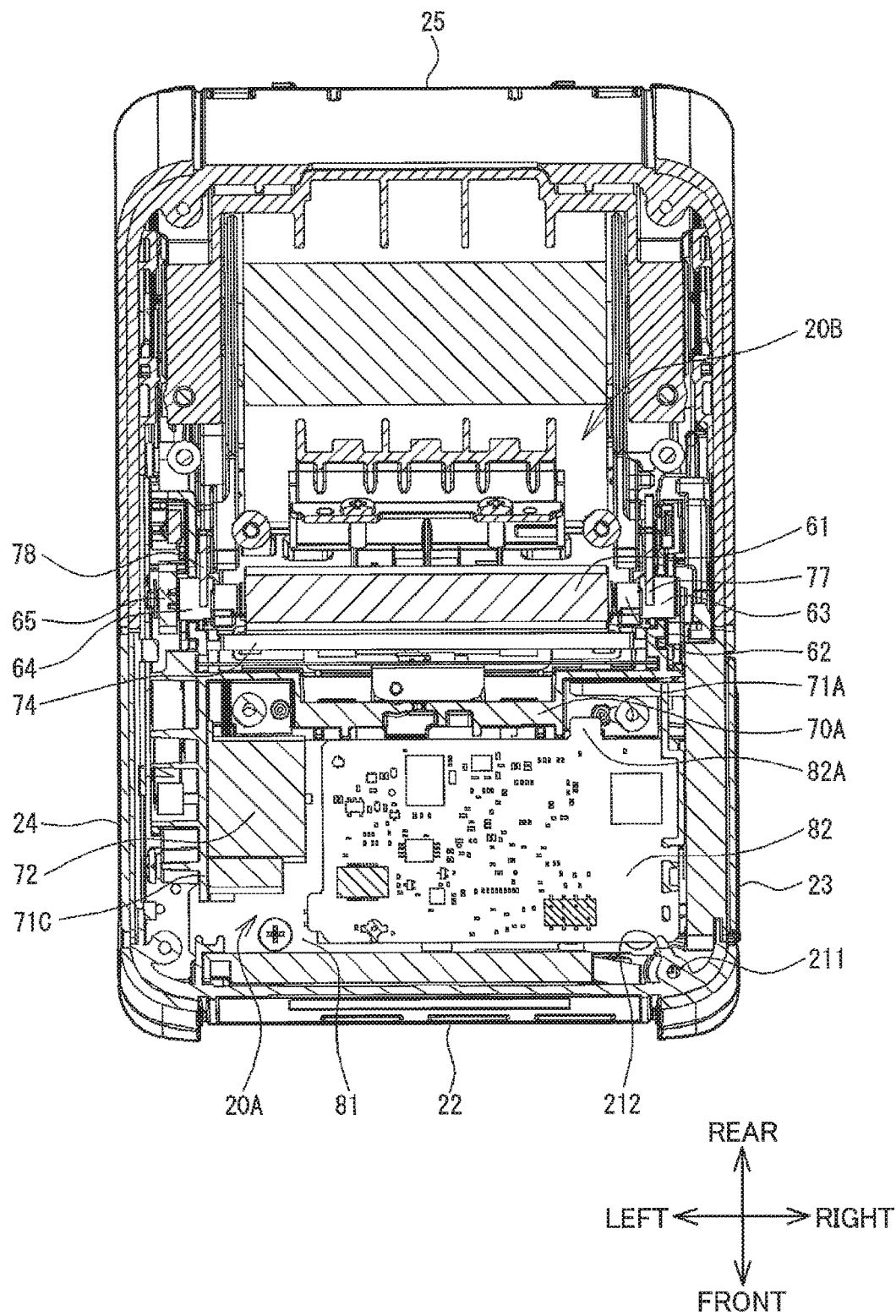
FIG. 22 is a cross-sectional view of the printing device 1 according to the embodiment, taken along a line B-B in FIG. 1.

As illustrated in FIG. 22, a protruding part 82A is formed on the rear edge of the control board 82 in an area slightly leftward from the right edge of the control board 82. The protruding part 82A is adjacent to a right end portion of the protruding part 70A formed on the support part 71A of the first frame member 7. The protruding part 82A is positioned on a right side relative to the right end portion of the protruding part 70A. The protruding part 212 protruding from the inner surface of the top wall portion 21 constituting the first top cover 2B (see FIG. 4) is adjacent to the front edge portion of the control board 82 near the right edge of the control board 82. The protruding part 212 is positioned on a front side relative to the front edge of the control board 82.

As illustrated in FIG. 21, the control board 83 has a left-right dimension smaller than the left-right dimension of the control board 82. A wireless module is mounted on the control board 83. A connector mounted on a bottom surface of the control board 83 is connected to a connector mounted on a top surface of the control board 82. The wireless module mounted on the control board 83 is electrically connected to the CPU and the like mounted on the control board 82 via these connectors. The control board 83 is supported on the control board 82 through these connectors.

The protruding part 213 (see FIG. 4) protruding from the inner surface of the top wall portion 21 constituting the first top cover 2B contacts a top surface of the control board 83, pressing the control board 83 downward. The control board 8 is thus sandwiched from top and bottom sides by the extension parts 265 of the first bottom cover 2A and the protruding part 70B (see FIG. 13) of the first frame member 7 and the protruding part 213 of the first top cover 2B. In other words, the control board 8 is disposed above the extension parts 265 and the protruding part 70B, and below the protruding part 213. In this way, the control board 8 is retained in the first accommodating section 20A.

<Second Frame Member 4>

As illustrated in FIG. 19, the second frame member 4 is accommodated in the second accommodating section 20B. The second frame member 4 is positioned rearward relative to the first frame member 7 (see FIG. 12). As illustrated in FIG. 20, the second frame member 4 is disposed at a position rearward relative to the support part 71A in the first frame member 7 and the second engaging part 79 of the engaging member 76. As illustrated in FIG. 2, the second frame member 4 retains a roll 40 about which a printing medium is wound.

Figure 23:
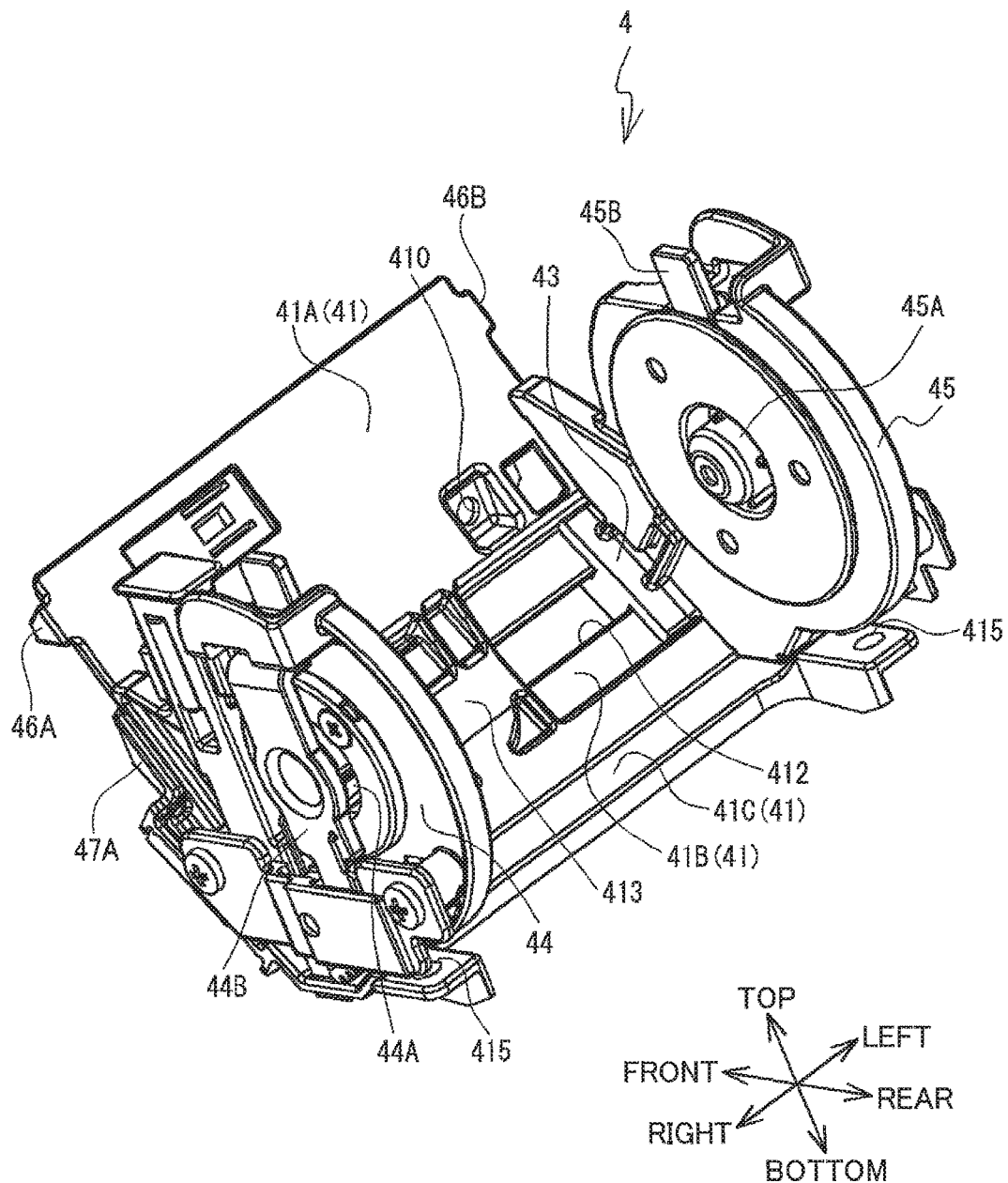
FIG. 23 is a perspective view of a second frame member 4 of the printing device 1 according to the embodiment.
Figure 24:
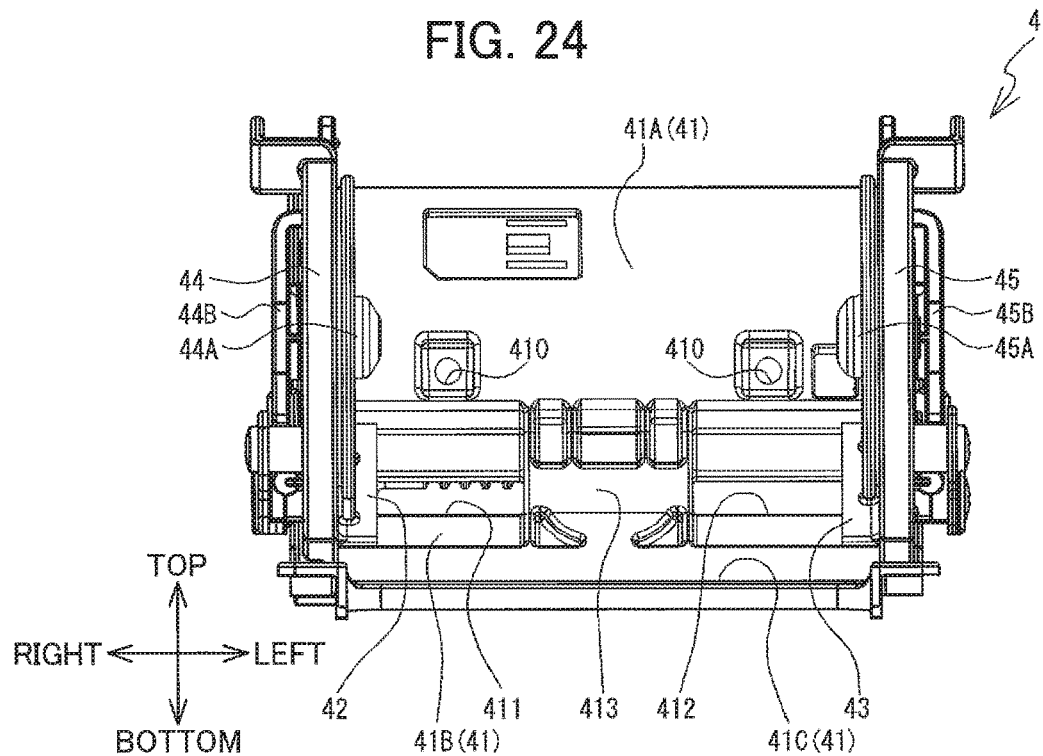
FIG. 24 is a rear side view of the second frame member 4 of the printing device 1 according to the embodiment.
Figure 25:
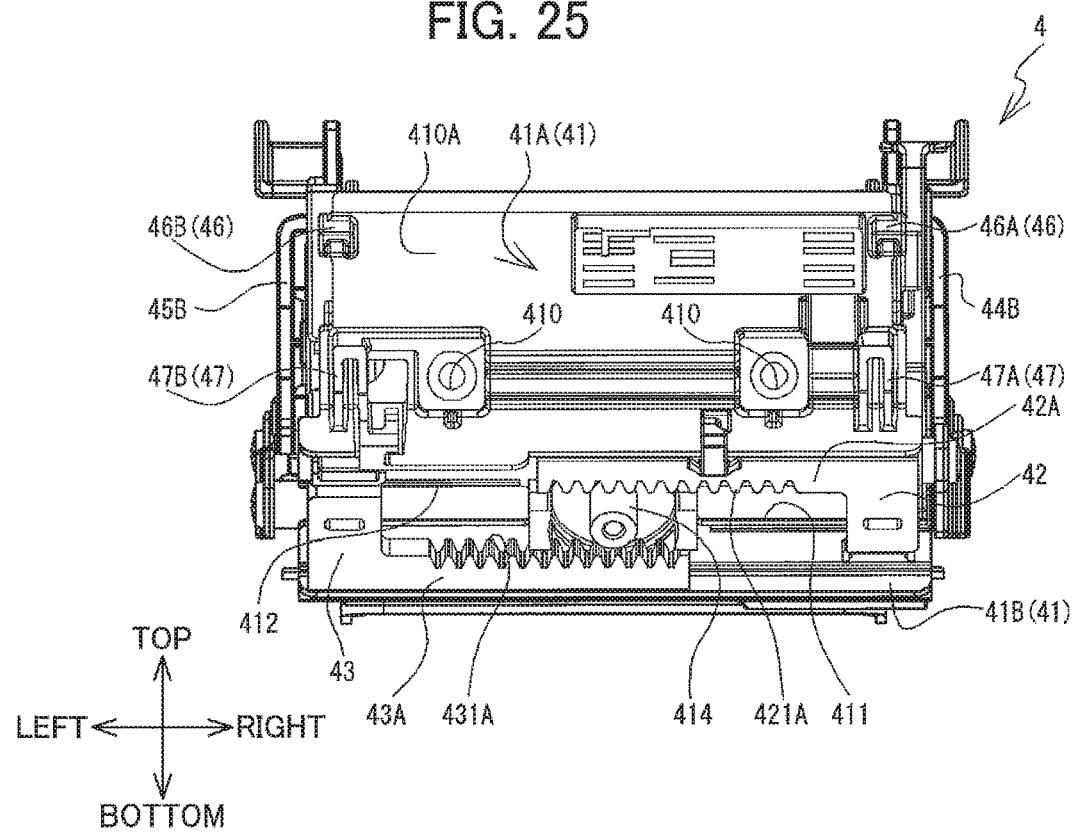
FIG. 25 is a front side view of the second frame member 4 of the printing device 1 according to the embodiment.

As illustrated in FIG. 23, the second frame member 4 is provided with plate-shaped base parts 41A, 41B, and 41C. In the following description, the base parts 41A, 41B, and 41C will be collectively referred to as the "base part 41." The base part 41A has a general rectangular shape. As illustrated in FIGS. 24 and 25, the base part 41A has two through-holes 410. The through-holes 410 are spaced apart from each other in the left-right direction.

Figure 26:
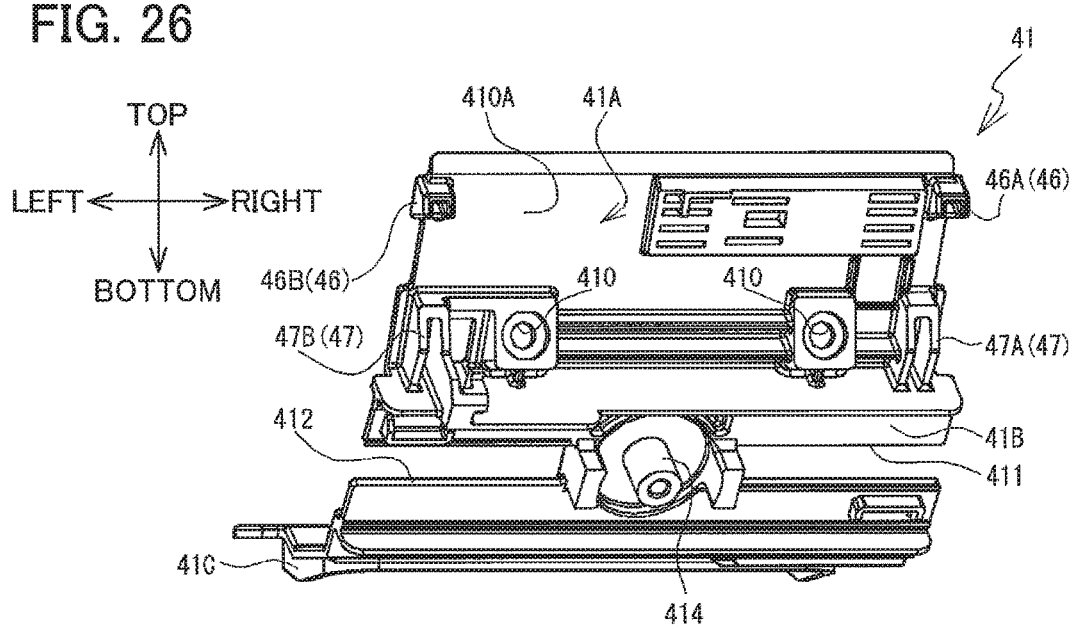
FIG. 26 is a perspective view of a base part 41 of the second frame member 4 of the printing device 1 according to the embodiment.

As illustrated in FIGS. 25 and 26, the second frame member 4 is further provided with first abutting parts 46A and 46B and second abutting parts 47A and 47B. The first abutting parts 46A and 46B and the second abutting parts 47A and 47B are disposed on a front surface 410A of the base part 41A. Hereinafter, the first abutting parts 46A and 46B will be collectively referred to as the "first abutting part 46," and the second abutting parts 47A and 47B will be collectively called the "second abutting part 47." The first abutting part 46 and the second abutting part 47 function as ribs for reinforcing the base part 41A.

The first abutting part 46 is disposed on the front surface 410A near a top edge of the base part 41A and protrudes forward from the front surface 410A. The first abutting part 46A is disposed on a right edge portion of the front surface 410A, and the first abutting part 46B is disposed on a left edge portion of the front surface 410A. The first abutting parts 46A and 46B are provided near a top edge of the base part 41A on respective left and right sides. The first abutting parts 46A and 46B are positioned above the second engaging part 79 of the engaging member 76. The second abutting part 47 is disposed on the front surface 410A near a bottom edge of the base part 41A, i.e., on a bordering area with the base part 41B described later, and protrude forward from the front surface 410A. The second abutting part 47A is disposed on the right edge portion of the front surface 410A, and the second abutting part 47B is disposed on the left edge portion of the front surface 410A. The second abutting parts 47A and 47B are provided near a bottom edge of the base part 41A on respective left and right sides. The second abutting parts 47A and 47B are positioned below the second engaging part 79 of the engaging member 76.

As illustrated in FIG. 23, the base part 41B is connected to the bottom edge of the base part 41A and extends diagonally downward and rearward therefrom. As illustrated in FIG. 24, the base part 41B has notched grooves 411 and 412. The notched grooves 411 and 412 have a rectangular shape that is elongated in the left-right direction. The notched groove 411 extends leftward from a right edge portion of the base part 41B, and the notched groove 412 extends rightward from a left edge portion of the base part 41B. The notched grooves 411 and 412 are aligned in the left-right direction. The notched grooves 411 and 412 are separated from each other by an isolating part 413 disposed in a left-right center of the notched grooves 411 and 412. As illustrated in FIGS. 25 and 26, a shaft 414 is disposed on a front side of the isolating part 413. The shaft 414 rotatably supports a pinion gear (not illustrated).

The second frame member 4 is further provided with a support part 42 and a support part 43. As illustrated in FIG. 24, the support part 42 is fitted into the notched groove 411, and the support part 43 is fitted into the notched groove 412. The support part 42 can move in the left-right direction along the notched groove 411 between the right edge of the base part 41 and the approximate left-right center of the base part 41. The support part 43 can move in the left-right direction along the notched groove 412 between the left edge of the base part 41 and the approximate left-right center of the base part 41.

As illustrated in FIG. 25, a rack gear 42A extends leftward from a top end portion of the support part 42 on a front side relative to the base part 41B. The rack gear 42A has teeth 421A on a bottom edge thereof. A rack gear 43A extends rightward from a bottom end portion of the support part 43 on the front side relative to the base part 41B. The rack gear 43A has teeth 431A on a top edge thereof. The teeth 421A and 431A both meshedly engage with the pinion gear (not illustrated) supported on the shaft 414.

The second frame member 4 is further provided with an interposing part 44 and an interposing part 45. As illustrated in FIG. 24, on a rear side relative to the base part 41B, the interposing part 44 is connected to the support part 42, and the interposing part 45 is connected to the support part 43. As illustrated in FIG. 23, the interposing parts 44 and 45 are disc-shaped plate members that are substantially circular in a side view. The interposing parts 44 and 45 have surfaces that face in the leftward and rightward directions, respectively. The interposing parts 44 and 45 are separated from each other in the left-right direction. A through-hole is formed in a center portion of each of the interposing parts 44 and 45.

A plate-shaped support part 44B is disposed on a right side relative to the interposing part 44. The support part 44B is pivotally movable relative to the interposing part 44. A protruding part 44A is provided at the support part 44B. The protruding part 44A protrudes leftward from a left end of the support part 44B. The protruding part 44A is inserted into the through-hole formed in the interposing part 44 from a right side thereof. A left end portion of the protruding part 44A protrudes leftward from a left end surface of the interposing part 44.

A plate-shaped support part 45B is disposed on a left side relative to the interposing part 45. The support part 45B is pivotally movable relative to the interposing part 45. A protruding part 45A is provided at the support part 45B. The protruding part 45A protrudes rightward from a right end of the support part 45B. The protruding part 45A is inserted into the through-hole formed in the interposing part 45 from a left side thereof. A right end portion of the protruding part 45A protrudes rightward from a right end surface of the interposing part 45.

The interposing parts 44 and 45 move in opposing leftward and rightward directions in interlocking relation with each other through the rack gears 42A and 43A (see FIG. 25) and the pinion gear (not illustrated). For example, when the interposing part 44 moves leftward a prescribed amount, the rack gears 42A and 43A and the pinion gear move the interposing part 45 the prescribed amount rightward. Thus, the rack gears 42A and 43A and the pinion gear function to move the interposing parts 44 and 45 in a direction toward each other or in a direction away from each other.

As illustrated in FIG. 23, the base part 41C is connected to a bottom edge of the base part 41B and extends rearward therefrom. Two through-holes 415 are formed in the base part 41C, with one on a left end portion and one on a right end portion thereof.

The second frame member 4 is fixed inside the second accommodating section 20B in the following manner Screws (not illustrated) are inserted into the through-holes 410 formed in the second frame member 4 (see FIG. 24) from rear sides thereof and are screwed into the threaded holes 710B (see FIG. 14) formed in the support part 71A of the first frame member 7. Through this operation, the second frame member 4 is fixed to the support part 71A of the first frame member 7, with the front surface 410A (see FIG. 26) of the base part 41A opposing the rear side of the support part 71A. At this time, the second engaging part 79 of the engaging member 76 is disposed between the support part 71A of the first frame member 7 and the base part 41A of the second frame member 4. In addition, screws (not illustrated) are inserted from above into the through-holes 415 formed in the base part 41C of the second frame member 4 (see FIG. 23). The screws are then screwed into the threaded holes formed in the top ends of the extension parts 266 provided on the bottom wall portion 26 of the first bottom cover 2A (see FIG. 3). Through this operation, the second frame member 4 is fixed to the first bottom cover 2A, with the base parts 41B and 41C arranged along the inner surface of the bottom wall portion 26.

Figure 27:
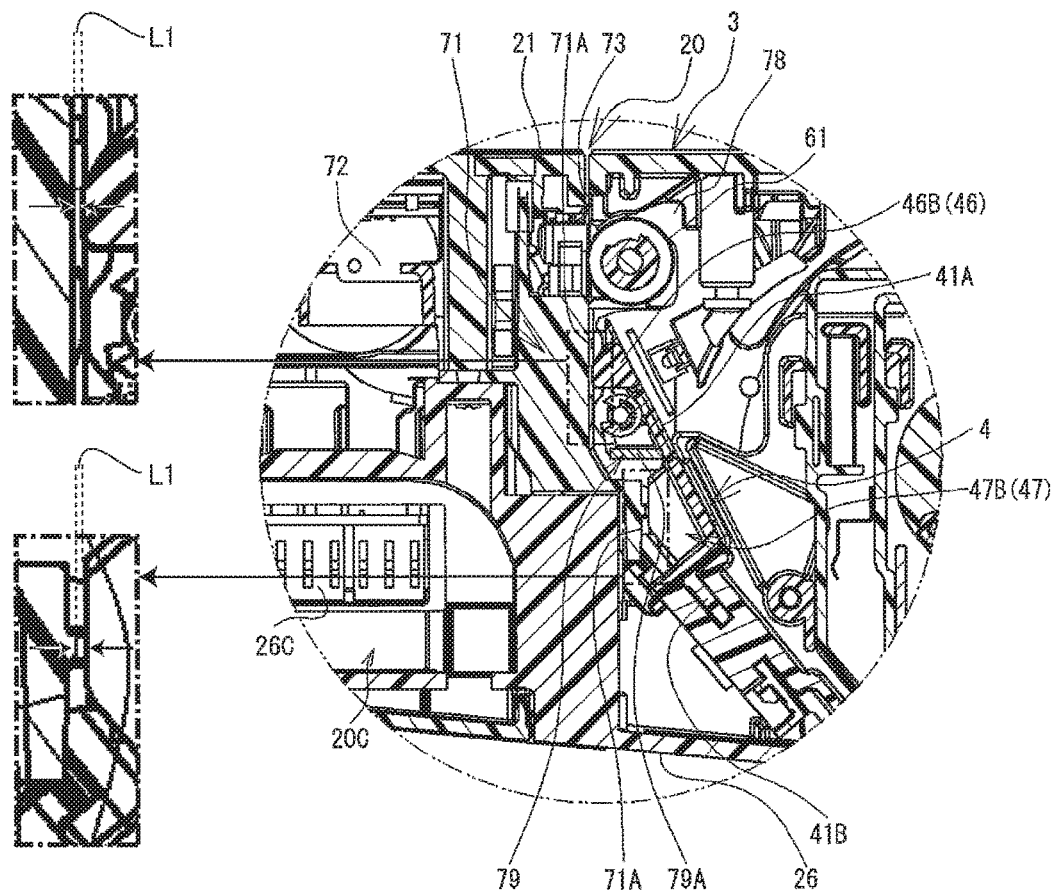
FIG. 27 is a partial enlarged cross-sectional view of the printing device 1 according to the embodiment illustrated in FIG. 1, taken along a line C-C in FIG. 14.

When the second frame member 4 is fixed in the second accommodating section 20B, as illustrated in FIG. 27, the first abutting part 46, that is, the first abutting parts 46A and 46B, is disposed adjacent to the rear end of the support part 71A constituting the first frame member 7 at positions on left and right sides relative to the open area 710H (see FIG. 14) that holds the movable plate 74. The position where the first abutting part 46 (first abutting parts 46A and 46B) is located relative to the support part 71A is indicated by A1 and A2 in FIG. 14. The first abutting part 46 is separated slightly from the support part 71A in the front-rear direction, forming a gap between the two. Hereinafter, the length of the gap between the support part 71A of the first frame member 7 and the first abutting part 46 of the second frame member 4 in the front-rear direction will be referred to as a "first gap length L1."

Similarly, the second abutting part 47, that is, the second abutting parts 47A and 47B, is disposed adjacent to the rear end of the support part 71A constituting the first frame member 7 at positions on a bottom side relative to the open area 710H. The position where the second abutting part 47 (second abutting parts 47A and 47B) is located relative to the support part 71A is indicated by A3 and A4 in FIG. 14. The second abutting part 47 is separated slightly from the support part 71A in the front-rear direction, forming a gap between the two. The length of this gap in the front-rear direction is substantially equal to the first gap length L1 defining the gap between the support part 71A and the first abutting part 46 in the front-rear direction. Thus, the length of the gap in the front-rear direction between the support part 71A of the first frame member 7 and the second abutting part 47 of the second frame member 4 will also be referred to as the "first gap length L1."

Figure 28:
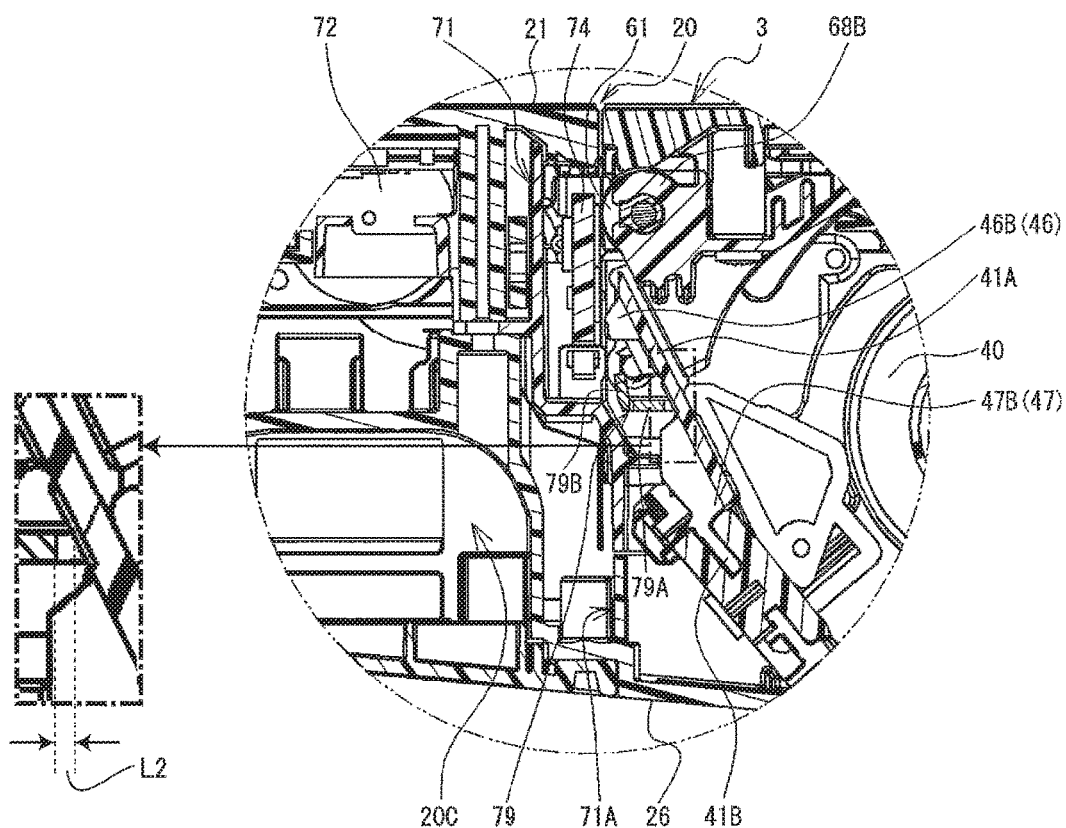
FIG. 28 is a partial enlarged cross-sectional view of the printing device 1 according to the embodiment illustrated in FIG. 1, taken along a line D-D in FIG. 14.

As illustrated in FIG. 28, a portion of the base part 41A constituting the second frame member 4 that is interposed between the first abutting part 46 and the second abutting part 47 in the up-down direction is disposed adjacent to the rear edge of the connecting part 79A constituting the second engaging part 79 of the engaging member 76. The base part 41A is separated from the connecting part 79A in the front-rear direction, forming a gap between the two. Hereinafter, the length of the gap between the connecting part 79A of the second engaging part 79 of the engaging member 76 and the base part 41A of the second frame member 4 in the front-rear direction will be referred to as a "second gap length L2." In this example, the second gap length L2 is greater than the first gap length L1 (L1<L2).

When the roll 40 is accommodated in the second accommodating section 20B, as illustrated in FIG. 2, the second frame member 4 supports a right end of the roll 40 with the interposing part 44 (see FIG. 23) and supports a left end of the roll 40 with the interposing part 45 (see FIG. 23). At this time, the interposing parts 44 and 45 are moved interlockingly in the leftward and rightward directions to suit the width of the roll 40, thereby adjusting the gap between the protruding parts 44A and 45A. The protruding part 44A that protrudes leftward from the interposing part 44 and the protruding part 45A that protrudes rightward from the interposing part 45 are inserted into a tubular-shaped core (not illustrated) of the roll 40. With this arrangement, the interposing parts 44 and 45 rotatably interpose the roll 40 from outer sides thereof in the left-right direction.

<Operational Advantages of Embodiment>

The printing device 1 might be accidentally dropped, for example when the front wall portion 22 is facing downward and the second cover 3 is in the closed state. In such a case, an impact is exerted on the roll 40 retained in the second frame member 4, causing the roll 40 to move forward. By moving forward, the roll 40 may also abut against the base part 41A, causing the base part 41A to deform by bending forward. The second engaging part 79 of the engaging member 76 in the first state is disposed in front of the base part 41A. When the bending base part 41A comes into contact with the second engaging part 79 from a rear side thereof, for example, the engaging member 76 may rotate clockwise due to the second engaging part 79 applying pressure forward, causing the engaging member 76 to move from the first position to the second position. At this time, the second cover 3 could shift to the open state since the second cover 3 can now be pivotally moved clockwise from the closed state by the urging force of the springs 253. If the second cover 3 were in the open state when the printing device 1 is dropped, not only would printing be discontinued, but also the roll 40 in the second accommodating section 20B may be discharged from the second frame member 4.

However, the second frame member 4 is provided with the first abutting part 46 and the second abutting part 47 in the printing device 1 of the embodiment. The first abutting part 46 and the second abutting part 47 abut against the support part 71 of the first frame member 7 at respective positions A1 through A4 indicated in FIG. 14 when the second frame member 4 deforms. That is, the base part 41A does not come into contact with the second engaging part 79 of the engaging member 76 even when the second frame member 4 deforms. Accordingly, the printing device 1 can suppress the engaging member 76 from moving from the first position to the second position due to the base part 41A of the second frame member 4 contacting the second engaging part 79 of the engaging member 76 in the first position and can thereby prevent the second cover 3 from opening. That is, the base part 41A of the second frame member 4 abuts against the support part 71A of the first frame member 7 through the first abutting part 46 and the second abutting part 47 when the second frame member 4 is deformed upon application of the external force. Therefore, the first abutting part 46 and the second abutting part 47 can suppress movement of the engaging member 76 from the first position to the second position due to the base part 41A of the second frame member 4 contacting the connecting part 79B of the second engaging part 79 of the engaging member 76 in the first position. In other words, the first abutting part 46 and the second abutting part 47 can avoid direct contact between the second engaging part 79 of the engaging member 76 in the first position and the base part 41A of the second frame member 4 since the base part 41A of the second frame member 4 contacts the support part 71A of the first frame member 7 through the first abutting part 46 and the second abutting part 47 when the second frame member 4 is deformed by the external force. Therefore, if the printing device 1 is dropped, the first abutting part 46 and the second abutting part 47 provided on the second frame member 4 can suppress the second cover 3 from opening due to an impact from the fall.

The engaging member 76 has the first engaging parts 77 and 78 that are separated in the left-right direction. With this arrangement, the engaging member 76 can engage with the platen body 60 of the second cover 3 at two different locations. Accordingly, the engaging member 76 of the printing device 1 can maintain the closed state of the second cover 3 with stability. The engaging member 76 also has the second engaging part 79 that connects the first engaging part 77 to the first engaging part 78, enabling the engaging member 76 to move the first engaging parts 77 and 78 between the first position and the second position in association with each other. Further, when the printing device 1 is dropped, the first abutting part 46 and the second abutting part 47 can prevent the first engaging parts 77 and 78 from moving to the second position due to the base part 41A of the second frame member 4 contacting the second engaging part 79, thereby suppressing the second cover 3 from opening.

The first abutting part 46 includes the first abutting parts 46A and 46B provided respectively on left and right sides of the base part 41A constituting the second frame member 4. Accordingly, the printing device 1 can suppress the base part 41A of the second frame member 4 from contacting the second engaging part 79 that extends in the left-right direction on both left and right sides thereof. Hence, the printing device 1 can suitably prevent the second cover 3 from opening by suppressing the second frame member 4 from contacting the second engaging part 79 across the entire left-right dimension of the second engaging part 79.

The second frame member 4 has the first abutting part 46 on the top end portion of the base part 41A and the second abutting part 47 on the bottom end portion of the base part 41A. The first abutting part 46 and the second abutting part 47 interpose the second engaging part 79 of the engaging member 76 from top and bottom sides thereof. Accordingly, the printing device 1 can prevent the base part 41A of the second frame member 4 from contacting the second engaging part 79 of the engaging member 76 at both top and bottom sides relative thereto. Thus, the printing device 1 can prevent the second frame member 4 from contacting the second engaging part 79 better than if the first abutting part 46 and the second abutting part 47 were provided only one side relative to the second engaging part 79 with respect to the up-down direction, thereby more suitably preventing the second cover 3 from opening.

In the printing device 1, the second cover 3 is pivotally movably supported to the first cover 2 on its rear edge while the platen body 60 is supported by the second cover 3 at the front edge of the second cover 3. The printing device 1 can thus maintain the second cover 3 in the closed state reliably by engaging the engaging member 76 with the platen bearings 63 and 64 of the platen body 60. Since the outer left and right side portions of the platen body 60 relative to the platen 61 are supported by the first engaging parts 77 and 78 at this time, the position of the platen 61 can be stabilized. Hence, by placing the second cover 3 in the closed state, the printing device 1 can reliably press the platen 61 against the thermal head 74A in order to maintain good printing quality.

The support part 71A of the first frame member 7 is disposed near the rear end portion of the first accommodating section 20A in the first cover 2, i.e., at the approximate front-rear center portion of the interior of the first cover 2. The second frame member 4 is accommodated in the second accommodating section 20B, which is the interior portion of the first cover 2 from the approximate front-rear center portion to the rear end thereof. Accordingly, the base part 41A of the second frame member 4 is disposed on a rear side relative to the support part 71A. Further, the second frame member 4 has the interposing parts 44 and 45 that can move in the left-right direction. The interposing parts 44 and 45 can interpose the roll 40 from left and right sides thereof. If a force directed in the forward direction is applied to the roll 40 when the printing device 1 is dropped, the roll 40 may detach from the interposing parts 44 and 45 and move forward, contacting and deforming the base part 41A of the second frame member 4. However, the first abutting part 46 and the second abutting part 47 are formed on the front surface 410A of the base part 41A confronting the first frame member 7. As a result, when the base part 41A deforms, the first abutting part 46 and the second abutting part 47 abut against the first frame member 7. Accordingly, the first abutting part 46 and the second abutting part 47 can prevent the base part 41A from contacting the engaging member 76 and opening the second cover 3.

The first gap length L1 denoting the length of the gap in the front-rear direction between the support part 71A of the first frame member 7 and the first abutting part 46 of the second frame member 4 and the length of the gap in the front-rear direction between the support part 71A and the second abutting part 47 of the second frame member 4 is smaller than the second gap length L2 denoting the length of the gap in the front-rear direction between the connecting part 79A of the second engaging part 79 constituting the engaging member 76 and the base part 41A of the second frame member 4 (L1<L2). When the base part 41A of the second frame member 4 deforms with this configuration, the gap between the second engaging part 79 of the engaging member 76 and the base part 41A of the second frame member 4 remains, even though the first abutting part 46 and the second abutting part 47 abut against the support part 71A of the first frame member 7 and eliminate the gap therebetween. Accordingly, the first abutting part 46 and the second abutting part 47 in the printing device 1 can suitably prevent the second frame member 4 from contacting the engaging member 76 and opening the second cover 3.

When mounting the battery 5 in the third accommodating section 20C, the user inserts the left wall portion 55 of the battery 5 into the third accommodating section 20C first. Through the process of inserting the battery 5 in the third accommodating section 20C, the protruding part 510 on the right wall portion 54 is fitted into the recessed part 26B of the third accommodating section 20C. The protruding part 510 of the battery 5 does not contact the left edge portion of the recessed part 26B, even when the battery 5 is completely mounted in the third accommodating section 20C. Here, assume that the user mistakenly attempts to insert the battery 5 into the third accommodating section 20C with the right wall portion 54 inserted first. In this case, the protruding part 510 on the right wall portion 54 would contact the left edge portion of the recessed part 26B of the third accommodating section 20C as the battery 5 is inserted into the third accommodating section 20C, thereby preventing further insertion. In other words, this configuration would prevent insertion of the battery 5 into the third accommodating section 20C before the battery 5 was completely mounted in the third accommodating section 20C, and the user would come to realize that the battery 5 was being mounted in an incorrect left-right orientation. Thus, by providing the protruding part 510 on the battery 5 and forming the recessed part 26B in the third accommodating section 20C, the printing device 1 can prevent the battery 5 from being inserted into the third accommodating section 20C in an incorrect left-right orientation.

Note that the recessed part 26B of the third accommodating section 20C extends leftward a prescribed distance. That is, the left edge of the recessed part 26B is positioned a prescribed distance leftward from the right edge of the third accommodating section 20C. This distance is established to prevent the user from forcibly inserting the right wall portion 54 of the battery 5 into the third accommodating section 20C with the battery 5 slightly tilted. Specifically, if the left-right dimension of the recessed part 26B were small and the left edge of the recessed part 26B were disposed near the right edge of the third accommodating section 20C, the protruding part 510 of the battery 5 could pass over the left edge of the recessed part 26B and move farther leftward into the third accommodating section 20C if the user forcibly inserted the right wall portion 54 of the battery 5 with the battery 5 slightly tilted (with the right end raised higher than the left, for example). However, in the embodiment, the left edge of the recessed part 26B is positioned a prescribed distance leftward from the right edge of the third accommodating section 20C. As a result, if the user attempts to insert the right wall portion 54 of the battery 5 into the third accommodating section 20C with the battery 5 slightly tilted, the first inner wall portions 261 and 262, the second inner wall portion 263, and the top surface of the cover member 26A defining the third accommodating section 20C would guide the battery 5 and correct any tilt therein, ensuring that the protruding part 510 of the battery 5 reliably contacts the left edge of the recessed part 26B. Consequently, the user can be prevented from forcibly mounting the battery 5 into the third accommodating section 20C by inserting the right wall portion 54 first.

The left wall portion 55 of the battery 5 has the protruding parts 55A, 55B, and 55C that protrude leftward. When the battery 5 is mounted in the third accommodating section 20C, the spring 26D of the third accommodating section 20C contacts the part P1 of the left wall portion 55 positioned beneath the protruding part 55B and rearward of the protruding part 55C and is compressively deformed. Accordingly, the spring 26D urges the battery 5 rightward. With this configuration, the protruding parts 55B and 55C of the battery 5 can prevent the position of the part P1 at which the spring 26D contacts the left wall portion 55 from changing.

Thus, the position at which the spring 26D contacts the battery 5 is prevented from changing when an impact or the like is exerted on the printing device 1. If the part P1 were to change, the spring 26D would become compressed at an angle to the left-right direction. As a result, the urging force generated by the spring 26D may vary and the deformed spring 26D may not return to its original state. Since the embodiment prevents any change in the position of the part P1 at which the spring 26D contacts the battery 5, the spring 26D can reliably urge the battery 5. Accordingly, the printing device 1 can reliably retain the battery 5 in the third accommodating section 20C.

The control board 82 has the protruding part 82A positioned on the right side of and adjacent to the right end portion of the protruding part 70A on the support part 71A of the first frame member 7. Hence, if a force is applied to the control board 82 in the leftward direction due to an impact from a fall, for example, the protruding part 82A of the control board 82 would abut against the right end of the protruding part 70A on the support part 71A and prevent the control board 82 from moving leftward at the rear edge of the control board 82. Note that the control board 82 could rotate clockwise in a top view when the protruding part 82A of the control board 82 abuts against the protruding part 70A due to the leftward force being applied to the control board 82. To prevent this rotation, the protruding part 212 is provided on the top wall portion 21 of the first top cover 2B and protrudes from the inner surface of the top wall portion 21. The protruding part 212 is adjacent to the front edge portion of the control board 82 near the right edge thereof. Hence, if the control board 82 were to rotate clockwise in the top view, the protruding part 212 of the first top cover 2B would abut against the control board 82 and prevent the right-front corner of the control board 82 from rotating forward.

Providing the protruding part 82A on the control board 82 and the protruding part 212 on the first top cover 2B in this way can suitably restrain movement of the control board 82 when a force in the leftward direction is exerted on the control board 82. In the printing device 1, the control board 82 is retained on the control board 81 through the connectors that function to electrically connect the control board 82 to the control board 81. Consequently, the control board 82 is susceptible to movement when external forces are applied. However, the protruding part 82A of the control board 82 and the protruding part 212 of the first top cover 2B restrain movement of the control board 82 from both front and rear sides thereof. Accordingly, the printing device 1 can suitably restrain movement of the control board 82 in response to the external forces.

Figure 29:
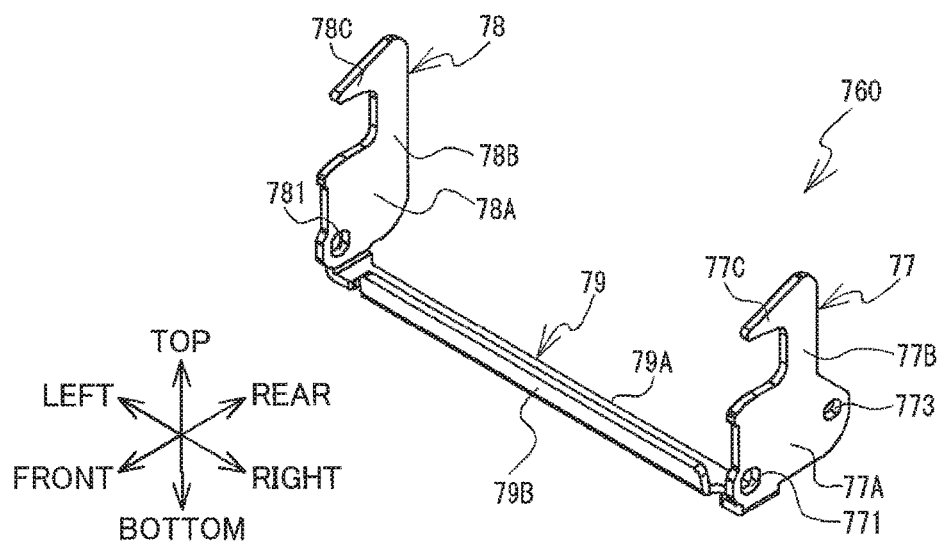
FIG. 29 is a perspective view of an engaging member 760 according to prior art.

In the engaging member 76, the rear edge of the first engaging part 77 is recessed forward in the portion corresponding to the extension part 77B relative to the portions corresponding to the base part 77A and the protruding part 77C. Further, the rear edge of the first engaging part 78 is recessed farther forward at the portion corresponding to the base part 78A relative to the portion corresponding to the extension part 78B. For comparison, FIG. 29 illustrates a conventional engaging member 760. The shape of the engaging member 760 differs from that of the engaging member 76 according to the embodiment (see FIG. 16) in the following two points.

First, the rear edges of the first engaging parts 77 and 78 differ between the engaging member 76 and the conventional engaging member 760. In the conventional engaging member 760, the rear edges of the first engaging parts 77 and 78 extend linearly in the up-down direction. Hence, the center of gravity in the conventional engaging member 76 is farther rearward than that of the engaging member 76 according to the embodiment. Hence, by recessing the rear edge of the engaging member 76 forward in portions corresponding to the extension part 77B and the extension part 78B, the center of gravity for the engaging member 76 is relatively forward. Consequently, the force generated by the weight of the engaging member 76 itself to rotate the engaging member 76 from the first position to the second position if an impact is incurred when the printing device 1 is dropped is smaller than that generated by the conventional engaging member 760.

The second difference is the existence of the through-hole 772. The conventional engaging member 760 does not possess a through-hole that corresponds to the through-hole 772 in the engaging member 76 of the embodiment. Consequently, the engaging member 760 is heavier than the engaging member 76. Specifically, the weight of the engaging member 76 is reduced by forming the through-hole 772 in the engaging member 76 and by recessing the rear edges of the engaging member 76 in portions corresponding to the extension part 77B and the extension part 78B. Consequently, the force generated by the weight of the engaging member 76 itself to rotate the engaging member 76 from the first position to the second position if an impact is incurred when the printing device 1 is dropped is smaller than that generated by the conventional engaging member 760.

Therefore, since the printing device 1 of the embodiment reduces the weight of the engaging member 76 and moves the center of gravity for the engaging member 76 relatively forward, the engaging member 76 can more effectively suppress rotation from the first position to the second position to prevent the second cover 3 from opening in the event of an impact incurred when the printing device 1 is dropped than the conventional engaging member 760.

Further, various modifications and variations are conceivable.

<First Modification>

Figure 30:
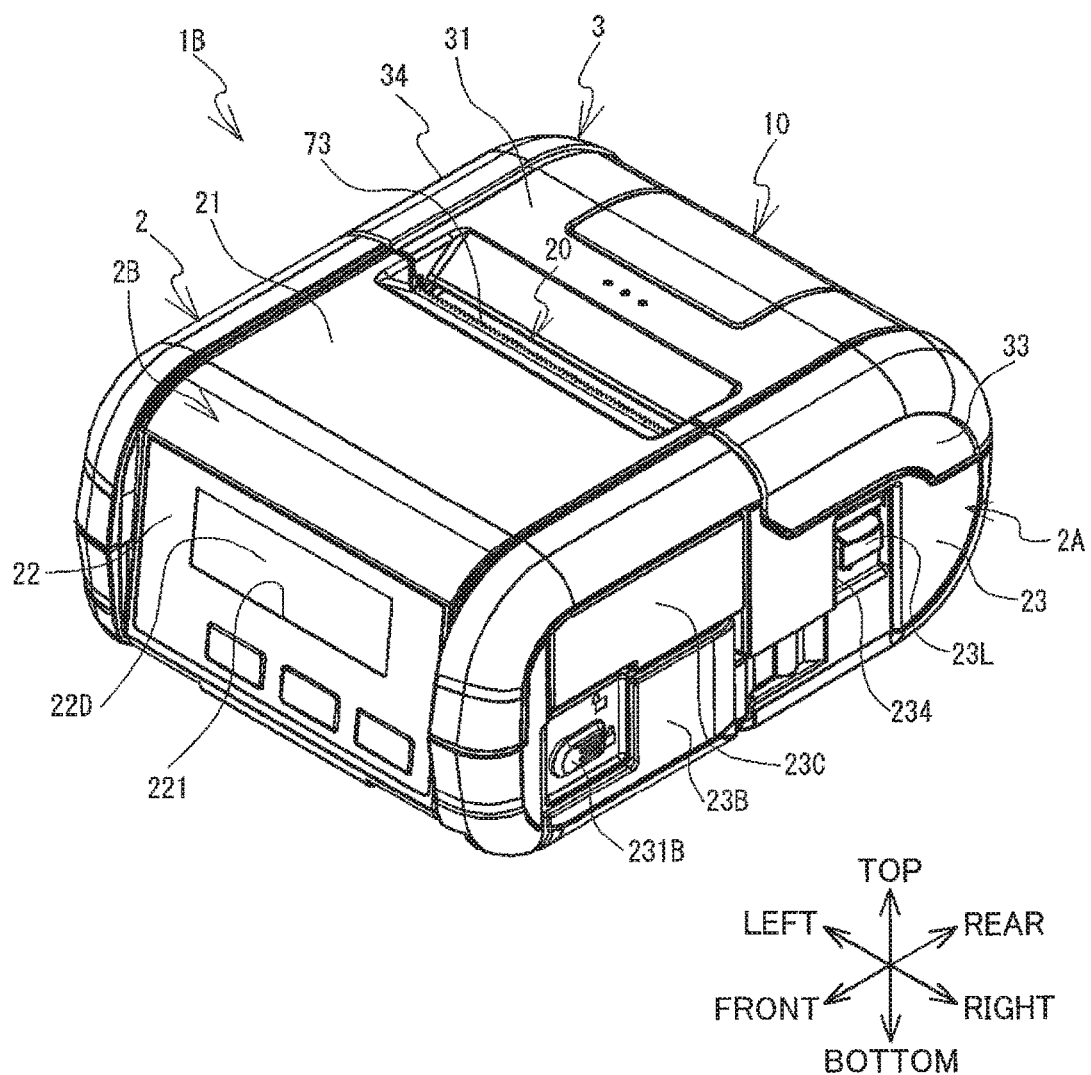
FIG. 30 is a perspective view of a printing device 1B according to a first modification to the embodiment, in which the printing device 1B is in a closed state.

Next, a printing device 1B according to a first modification of the embodiment will be described with reference to FIGS. 30 through 32. The printing device 1B differs from the printing device 1 of the embodiment in that the second accommodating section 20B is smaller and the second frame member 4 is replaced with a second frame member 9 accommodated in the second accommodating section 20B. The remaining structure (see FIG. 30) is identical to that of the printing device 1 of the embodiment (see FIG. 1), and like parts and components are designated with the same reference numerals to avoid duplicating description.

Figure 31:
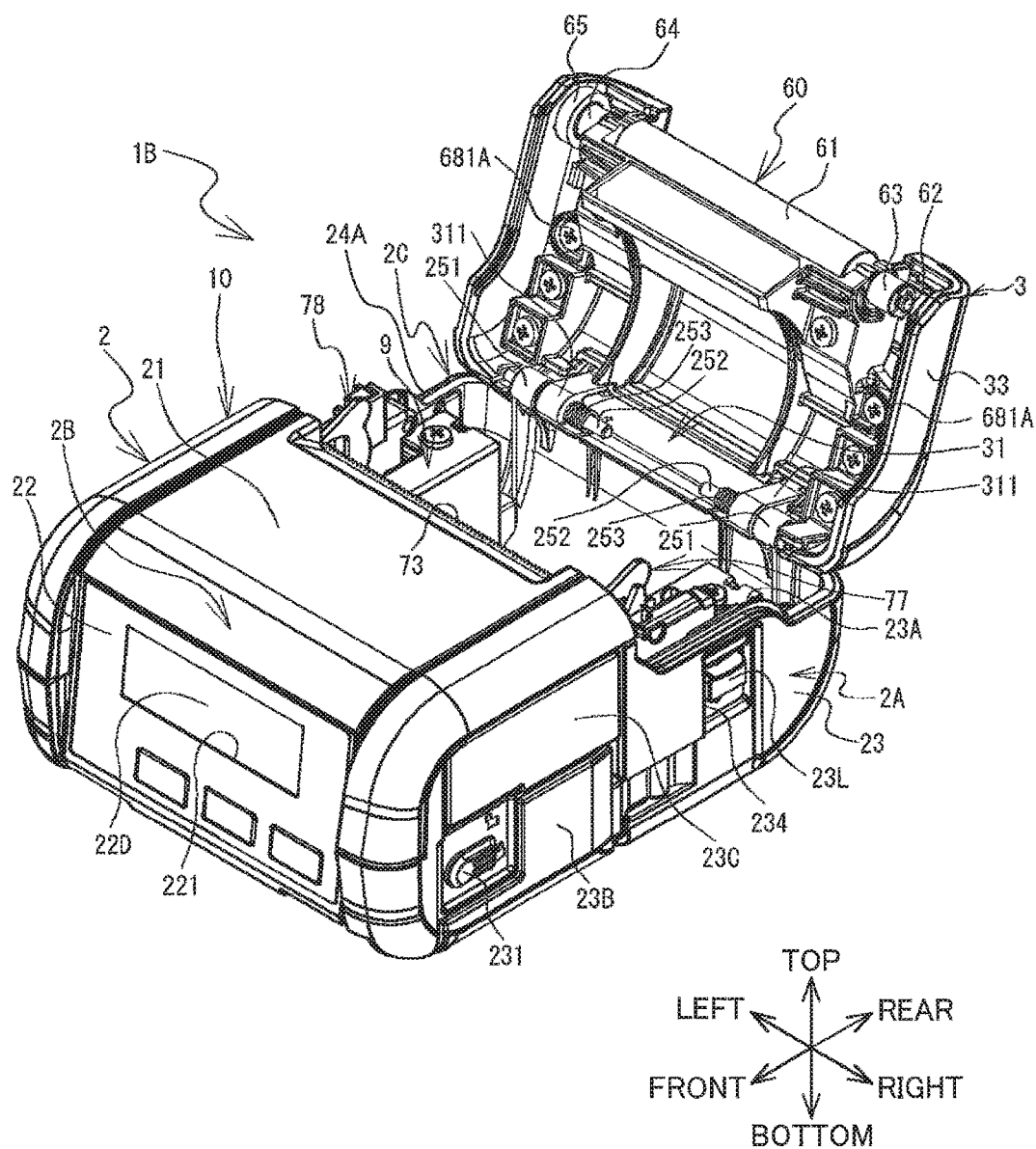
FIG. 31 is a perspective view of the printing device 1B according to the first modification, in which the printing device 1B is in an open state.

As illustrated in FIG. 31, the second accommodating section 20B in the printing device 1B has a front-rear dimension approximately two-thirds the front-rear dimension of the second accommodating section 20B in the printing device 1. Consequently, the front-rear dimensions of the edge parts 23A and 24A on the first cover 2 and the second cover 3 are smaller than those in the printing device 1.

Figure 32:
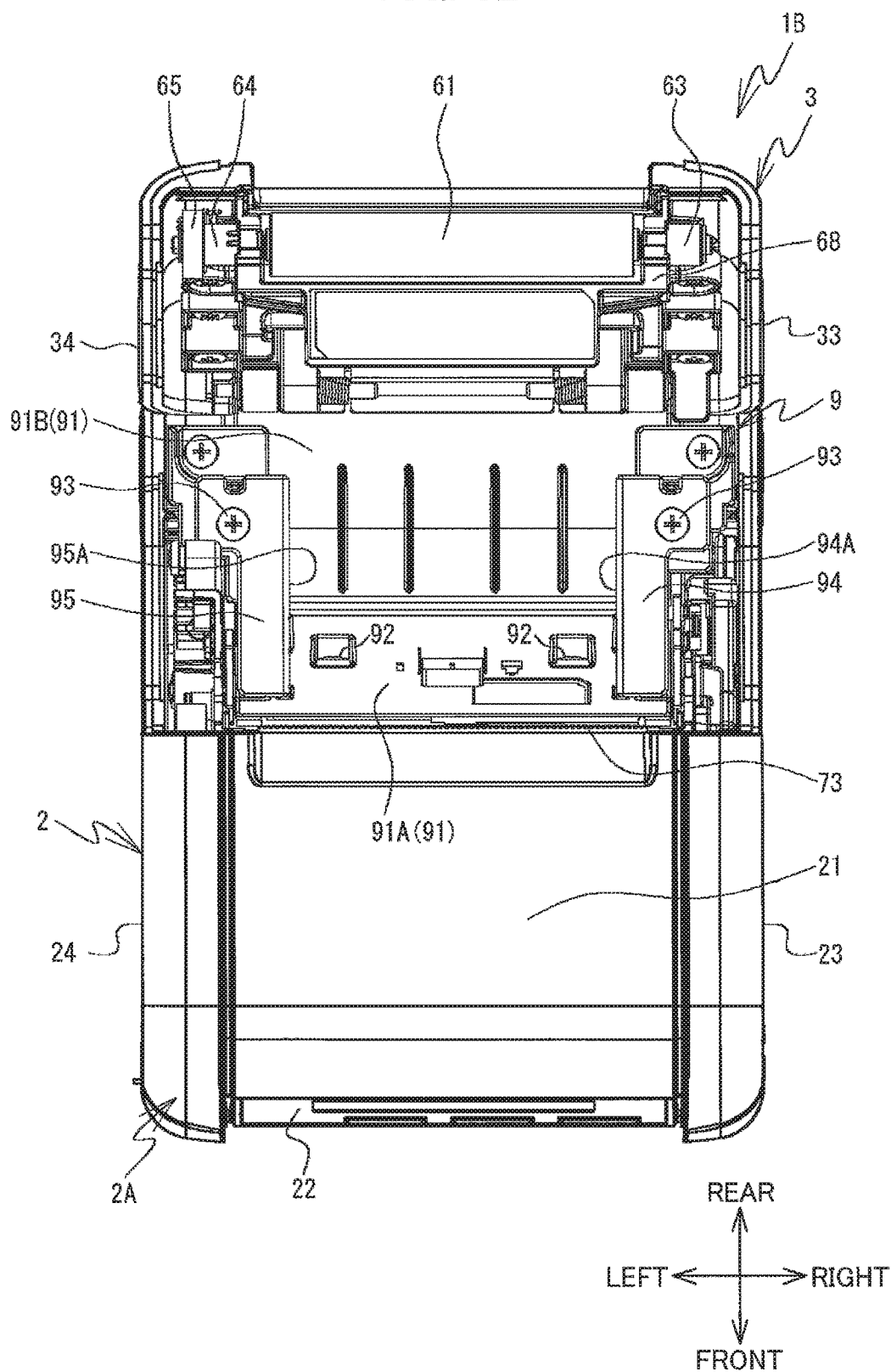
FIG. 32 is a top plan view of the printing device 1B according to the first modification, in which the printing device 1B is in the open state.

As illustrated in FIGS. 31 and 32, the second frame member 9 is accommodated in the second accommodating section 20B of the printing device 1B. As illustrated in FIG. 32, the second frame member 9 has base parts 91A and 91B (hereinafter referred to as the "base part 91"), and interposing parts 94 and 95. The base parts 91A and 91B are plate-shaped. The base part 91 corresponds to the base part 41 of the printing device 1 (see FIG. 23). The base part 91A corresponds to the base parts 41A and 41B of the printing device 1, and the base part 91B corresponds to the base part 41C of the printing device 1. A front surface of the base part 91A opposes the support part 71A of the first frame member 7. At this time, the second engaging part 79 of the engaging member 76 is disposed between the support part 71A and the base part 91A. A first abutting part and a second abutting part (not illustrated) are provided on the front surface of the base part 91A. The shapes of the first abutting part and the second abutting part are identical to the first abutting part 46 and the second abutting part 47 in the printing device 1.

Two through-holes are formed in the base part 91A, and screws 92 are inserted through these through-holes from a rear sides thereof. The screws 92 are screwed into the threaded holes 710B (see FIG. 14) formed in the support part 71A of the first frame member 7. Through this structure, the second frame member 9 is fixed to the support part 71A of the first frame member 7, with the front surface of the base part 91A opposing the rear side of the support part 71A. At this time, the second engaging part 79 of the engaging member 76 is disposed between the support part 71A of the first frame member 7 and the base part 91A of the second frame member 9.

The base part 91B extends rearward from a rear edge of the base part 91A. Through-holes are formed in a rear end portion of the base part 91B near left and right edges thereof. Screws 93 are inserted through these through-holes from above. The screws 93 are screwed from above into threaded holes formed in the top ends of the extension parts 266 (see FIG. 3) provided on the bottom wall portion 26 of the first bottom cover 2A. Through this structure, the second frame member 9 is fixed to the first bottom cover 2A, with the base part 91B arranged along the inner surface of the bottom wall portion 26.

The interposing part 94 extends upward from a right end portion of the base part 91B. The interposing part 94 has a plate-shaped part 94A that extends orthogonal to the left-right direction. The interposing part 95 extends upward from a left end portions of the base part 91B. The interposing part 95 has a plate-shaped part 95A that extends orthogonal to the left-right direction. The inner surfaces of the plate-shaped parts 94A and 95A oppose each other. Unlike the printing device 1 in the embodiment, the interposing parts 94 and 95 do not move in the left-right direction. Accordingly, a gap distance between the plate-shaped parts 94A and 95A is fixed. Printing medium (not illustrated) is disposed in a space surrounded by the base parts 91A and 91B and the plate-shaped parts 94A and 95A.

As in the printing device 1 of the embodiment, the printing device 1B having the structure described above provides the first abutting part and the second abutting part on the second frame member 9. When the second frame member 9 is deformed by an impact due to a fall, the first abutting part and the second abutting part abut against the support part 71 of the first frame member 7, preventing the base part 91A from coming into contact with the second engaging part 79 of the engaging member 76. Consequently, the printing device 1B can prevent the engaging member 76 from moving from the first position to the second position due to the base part 91A of the second frame member 9 contacting the second engaging part 79, thereby preventing the second cover 3 from opening.

<Second Modification>

Next, a printing device 1C provided with a second frame member 4B according to a second modification of the embodiment will be described with reference to FIGS. 33 and 34. The second frame member 4B differs from the second frame member 4 of the embodiment in the addition of a restraining part 48. The remaining structure of the second frame member 4B is identical to that of the second frame member 4 of the embodiment, and like parts and components are designated with the same reference numerals to avoid duplicating description. Note that, for the sake of clarity, cross sections of the connecting part 79A and the 79B are illustrated in FIGS. 33 and 34 without hatching.

Figure 33:
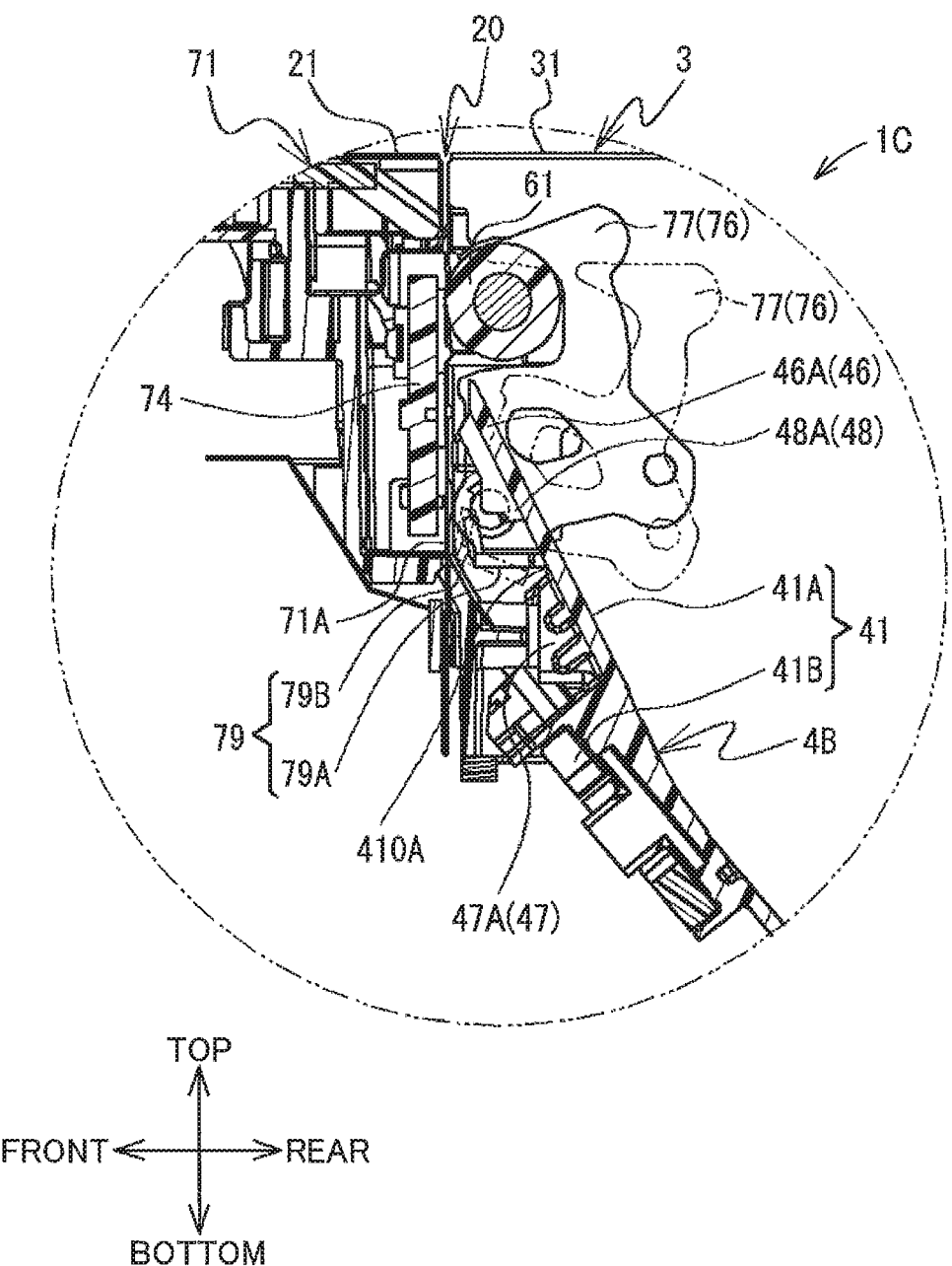
FIG. 33 is a cross-sectional view of a second frame member 4B and the engaging member 76 of a printing device 1C according to a second modification to the embodiment, in which the second frame member 4B has not yet been deformed.
Figure 34:
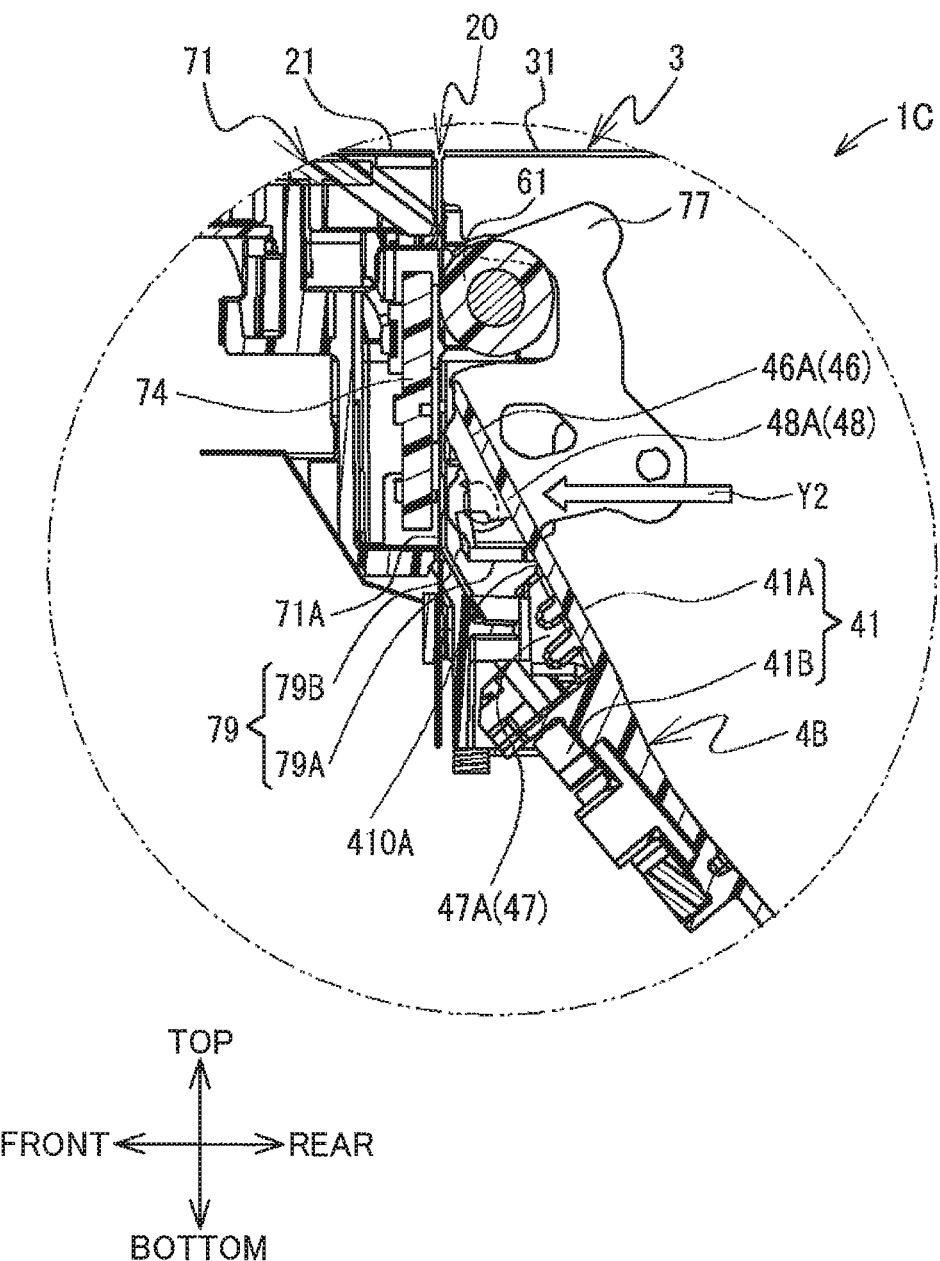
FIG. 34 is a cross-sectional view of the second frame member 4B and the engaging member 76 of the printing device 1C according to the second modification, in which the second frame member 4B has been deformed.

As illustrated in FIG. 33, the restraining part 48 is disposed on the front surface 410A of the base part 41A constituting the second frame member 4B at a position below the first abutting part 46. The restraining part 48 protrudes forward from the front surface 410A of the base part 41A. The restraining part 48 include a restraining part 48A disposed below the first abutting part 46A, and a restraining part (not illustrated) disposed below the first abutting part 46B. The first abutting part 46 and the restraining part 48 form a rib in conjunction with each other.

Relative to the second engaging part 79 of the engaging member 76, the restraining part 48 is disposed above the connecting part 79A and diagonally above and rearward relative to the connecting part 79B. As illustrated in FIG. 33, the restraining part 48 does not overlap a path of movement for the engaging member 76 moving from the first state (indicated by a solid line in FIG. 33) to the second state (indicated by a dashed line in FIG. 33). Thus, the second engaging part 79 does not contact the restraining part 48 when the engaging member 76 moves between the first position and the second position.

If an impact is exerted on the roll 40 retained in the second frame member 4B having this configuration, the roll 40 is caused to move forward, and the forwardly moving roll 40 contacts the base part 41A. In such a case, the roll 40 exerts a force on the base part 41A of the second frame member 4B in a direction indicated by arrow Y2 in FIG. 34, causing the base part 41A to bend forward. At this time, a front end of the restraining part 48 abuts against the top edge portion of the connecting part 79B constituting the second engaging part 79 from above while the engaging member 76 is in the first state. Thus, the restraining part 48 is moved partially into the moving path of the engaging member 76 when the engaging member 76 moves from the first position to the second position. Consequently, even if the engaging member 76 were to move from the first position toward the second position, the connecting part 79B contacting a bottom end portion of the restraining part 48 would prevent the engaging member 76 from moving into the second position.

As described above, the restraining part 48 becomes positioned partially in the moving path of the second engaging part 79 when the engaging member 76 moves from the first position toward the second position as the base part 41A of the second frame member 4B deforms. In this state, the restraining part 48 restrains the engaging member 76 from moving from the first position to the second position. Hence, if the second frame member 4B deforms due to an external force, the restraining part 48 of the printing device 1 can suitably restrain the engaging member 76 from moving from the first position to the second position and opening the second cover 3.

<Other Modifications>

The printing method of the printing device 1 is not limited to thermal printing, but may be another method such as thermal transfer printing or inkjet printing. The first frame member 7 may additionally be provided with abutting parts that protrude rearward from the support part 71A. With this structure, if the second frame member 4 deforms due to an impact from a fall, the abutting parts on the first frame member 7 abut against the front surface 410A of the base part 41, restraining the base part 41 from contacting the second engaging part 79 of the engaging member 76 and preventing the engaging member 76 from moving to the second position. In this case, the first abutting part 46 and the second abutting part 47 need not be provided on the base part 41A of the second frame member 4.

In the printing device 1, the left-right dimension of the engaging member 76, i.e., the left-right distance between the first engaging parts 77 and 78, may be shorter than the left-right dimension of the base part 41 constituting the second frame member 4. In this case, the entire engaging member 76 may be disposed in front of the base part 41 of the second frame member 4. If the printing device 1 were to be dropped and the second frame member 4 were deformed by the impact of the fall, for example, the first abutting part 46 and the second abutting part 47 may prevent the base part 41 from contacting the engaging member 76 at a bottom portion of the first engaging parts 77 and 78 of the engaging member 76 in the first position, thereby preventing the engaging member 76 from moving to the second position.

The first abutting part 46 may instead be formed between positions near the left and right edges of the base part 41A. That is, the first abutting part 46 may be structured with the first abutting parts 46A and 46B connected to each other. The second abutting part 47 may also be formed between positions near the left and right edges of the base part 41A. In other words, the second abutting part 47 may also be structured with the second abutting parts 47A and 47B connected to each other. A single first abutting part 46 may also be provided on one of the left and right sides (the first abutting part 46A or 46B). Similarly, a single second abutting part 47 may be provided on one of the left and right sides (the second abutting part 47A or 47B). For example, the second frame member 4 may be provided with a combination including the first abutting part 46A and the second abutting part 47A, the first abutting part 46A and the second abutting part 47B, the first abutting part 46B and the second abutting part 47A, or the first abutting part 46B and the second abutting part 47B. Alternatively, the second frame member 4 may be provided with one of the first abutting part 46 or the second abutting part 47.

The portions of the second cover 3 engaged by the engaging member 76 when the second cover 3 is in the closed state are not limited to the platen bearings 63 and 64 on outer left and right sides relative to the platen 61. For example, the first engaging parts 77 and 78 of the printing device 1 may directly engage any portions on left and right end portions of the second cover 3 itself.

The first abutting part 46 of the second frame member 4 may be in constant contact with the support part 71A of the first frame member 7, and the second abutting part 47 of the second frame member 4 may also be in constant contact with the support part 71A of the first frame member 7. In other words, it is not necessary to have a gap formed between the first abutting part 46 and the first frame member 7 and a gap formed between the second abutting part 47 and the first frame member 7 in the normal state.

While the description has been made in detail with reference to the embodiment(s) thereof, it would be apparent to those skilled in the art that many modifications and variations may be made therein without departing from the scope of the disclosure.

<Remarks>

The front-rear direction is an example of a first direction. The left-right direction is an example of a second direction. The up-down direction is an example of a third direction. The thermal head 74A is an example of a printing mechanism. The first cover 2 is an example of a casing. The open area 2C is an example of an opening. The second cover 3 is an example of a cover. The second accommodating section 20B is an example of an accommodating section. The front surface 410A is an example of an opposing surface.

What is claimed is:

1. A printing device comprising:
    a printing mechanism including a print head configured to print an image on a printing medium;
    a housing having a box-like shape, the housing comprising:
        a casing having an opening; and
        a cover capable of opening and closing the opening;
    an accommodating section provided in the casing and configured to accommodate the printing medium therein, the accommodating section being exposed to an outside through the opening;
    a first frame accommodated in the casing and supporting the printing mechanism;
    a second frame accommodated in the casing and configured to support the printing medium, the second frame being arranged juxtaposed with the first frame in a first direction;
    an engaging member supported to the first frame, the engaging member movable between a first position and a second position, the engaging member in the first position being in engagement with the cover to close the cover, the engaging member in the second position being out of engagement with the cover to open the cover; and
    at least one abutment provided at at least one of the first frame and the second frame, the at least one abutment being configured to avoid direct contact between a part of the engaging member in the first position and the second frame when the second frame is deformed upon application of an external force and the second frame contacts the first frame through the at least one abutment.

2. The printing device according to claim 1, wherein the engaging member includes:
    a pair of first engaging parts separated from each other in a second direction perpendicular to the first direction, the pair of first engaging parts being engageable with the cover at two different positions; and
    a second engaging part extending in the second direction between the pair of first engaging parts, and
    wherein the second engaging part constitutes the part of the engaging member.

3. The printing device according to claim 2, wherein the second frame has one end portion and another end portion in the second direction, and
    wherein the at least one abutment includes a first abutting part and a second abutting part, the first abutting part being disposed at the one end portion of the second frame, the second abutting part being disposed at the another end portion of the second frame.

4. The printing device according to claim 2, wherein the at least one abutment includes a first abutting part and a second abutting part, the first abutting part and the second abutting part being disposed on opposite sides of the second engaging part in a third direction perpendicular to the first direction and the second direction.

5. The printing device according to claim 2, wherein the printing mechanism includes a thermal head,
    the printing device further comprising a platen having an axis extending in the second direction,
    wherein the cover has one end portion and another end portion in the first direction, the one end portion of the cover being supported by the casing so that the cover is pivotally movable relative to the casing about an axis extending in the second direction, the another end portion of the cover rotatably supporting the platen,
wherein the platen is configured to press the printing medium against the thermal head while the cover is closed, and
wherein the pair of first engaging parts is engageable with the cover at positions outside of the platen in the second direction.

6. The printing device according to claim 2, wherein the casing has one end portion, a center portion, and another end portion in the first direction,
wherein the first frame is accommodated in the casing at the center portion of the casing,
wherein the accommodating section is provided in the another end portion of the casing,
wherein the second frame is accommodated in the accommodating section, the second frame including:
a base part having a plate shape and opposing the first frame, the base part having an opposing surface opposing the first frame in the first direction; and
a pair of interposing parts configured to interpose the printing medium therebetween in the second direction, and
wherein the at least one abutment is formed on the opposing surface, the abutting part being configured to abut against the first frame upon deformation of the second frame by the external force, the external force being oriented in a direction from the another end portion of the casing to the one end portion of the casing and parallel to the first direction.

7. The printing device according to claim 1, wherein the at least one abutment is a rib formed at the second frame, and
wherein the first frame and the rib define a first gap distance therebetween, the engaging member and the second frame defining a second gap distance therebetween, the first gap distance being smaller than the second gap distance.

8. The printing device according to claim 1, wherein the second frame includes a restraining part, and
wherein, in a state where the second frame is deformed by the external force, at least a portion of the restraining part is positioned in a path of movement for the engaging member moving from the first position to the second position to restrain the engaging member in the first position from moving to the second position.

* * * * *